United States Patent
Shapiro

(10) Patent No.: US 12,360,255 B2
(45) Date of Patent: Jul. 15, 2025

(54) SYSTEMS AND METHODS FOR NAVIGATION SIGNAL CLUSTERING

(71) Applicant: The MITRE Corporation, McLean, VA (US)

(72) Inventor: Jerome Mark Shapiro, McLean, VA (US)

(73) Assignee: The MITRE Corporation, McLean, VA (US)

( * ) Notice: Subject to any disclaimer, the term of this patent is extended or adjusted under 35 U.S.C. 154(b) by 258 days.

(21) Appl. No.: 17/850,484

(22) Filed: Jun. 27, 2022

(65) Prior Publication Data

US 2022/0413164 A1 Dec. 29, 2022

Related U.S. Application Data

(60) Provisional application No. 63/215,646, filed on Jun. 28, 2021.

(51) Int. Cl.
*G01S 19/39* (2010.01)
*G01S 19/08* (2010.01)
*G01S 19/40* (2010.01)
*G01S 19/52* (2010.01)

(52) U.S. Cl.
CPC ............ *G01S 19/396* (2019.08); *G01S 19/08* (2013.01); *G01S 19/40* (2013.01); *G01S 19/52* (2013.01)

(58) Field of Classification Search
CPC ........ G01S 19/396; G01S 19/08; G01S 19/40; G01S 19/52
USPC ................................................... 342/357.24
See application file for complete search history.

(56) References Cited

U.S. PATENT DOCUMENTS

| | | | |
|---|---|---|---|
| 9,753,142 B2* | 9/2017 | Broussalian | G01S 19/015 |
| 10,883,829 B2 | 1/2021 | Irish et al. | |
| 2011/0025555 A1* | 2/2011 | Whitehead | G01S 19/41 |
| | | | 342/357.24 |
| 2017/0070971 A1* | 3/2017 | Wietfeldt | H04W 24/10 |
| 2020/0103533 A1* | 4/2020 | Stein | G01S 19/08 |

(Continued)

FOREIGN PATENT DOCUMENTS

CN 109901204 B 12/2020
KR 10-2021-0009352 A 1/2021

(Continued)

OTHER PUBLICATIONS

Chang et al. "Sparse Spatial and Temporal Estimation for Multipath Mitigation in GNSS,": 1267-1272.

(Continued)

*Primary Examiner* — James R Hulka
*Assistant Examiner* — Samarina Makhdoom
(74) *Attorney, Agent, or Firm* — Morrison & Foerster LLP

(57) ABSTRACT

Presented herein are systems and methods for generating a consistent set of signals to be processed by a PVT processor. In one or more examples, a GNSS receiver can receive a plurality of signals from a plurality of signal sources. In one or more examples, the systems and methods can generate clusters that have been vetted using cost functions so as to maximize the probability that any cluster that is sent to the PVT processor contains legitimate GNSS signals, and does not include any spoofed or otherwise illegitimate signals, thereby maximizing the probability that a PVT solution produced by the PVT processor is accurate.

21 Claims, 7 Drawing Sheets

(56) References Cited

U.S. PATENT DOCUMENTS

2020/0363535 A1   11/2020  Rouch et al.
2020/0379118 A1*  12/2020  Reid .................... G01S 19/074
2020/0408926 A1*  12/2020  Carcanague ........... G01S 19/20
2021/0003714 A1   1/2021  Clark

FOREIGN PATENT DOCUMENTS

WO   WO-2011010299 A1 *  1/2011  ........... B64G 1/1085
WO      2017/040076 A1    3/2017
WO      2020/209918 A2  10/2020

OTHER PUBLICATIONS

Jiao et al. (2021). "An Adaptive Vector Tracking Scheme for High-Orbit Degraded GNSS Signal," The Journal of Navigation 74(1): 105-124.

\* cited by examiner

SYSTEMS AND METHODS FOR NAVIGATION SIGNAL CLUSTERING

CROSS REFERENCE TO RELATED APPLICATIONS

This application is claims the benefit of U.S. Provisional Application No. 63/215,646, filed Jun. 28, 2021, the entire contents of which is incorporated herein by reference.

STATEMENT REGARDING FEDERALLY SPONSORED RESEARCH OF DEVELOPMENT

This invention was made with Government support under U.S. Government Contract No. 693KA8-22-C-00001, awarded by the Federal Aviation Administration. The Government has certain rights in this invention.

FIELD OF THE DISCLOSURE

This disclosure relates to systems and methods for generating consistent signal sets to be transmitted to a Position, Velocity, Time (PVT) processor for further processing to compute navigations solutions for a GNSS receiver.

BACKGROUND OF THE DISCLOSURE

A satellite navigation system is a system utilizing multiple satellite signals to determine the position of a receiver configured to receive GNSS signals. In a satellite navigation system, a receiver receives signals from multiple satellites that transmit positioning and timing data and uses the information received from the multiple satellites to determine its position. The GNSS receiver can achieve this by determining its position relative to multiple satellites and can then triangulate its calculated position relative to the satellites to determine its overall position.

In order to produce accurate positioning results, the GNSS receiver must ensure that the signals it is using to triangulate its position are actual signals that are being directly transmitted by a constellation of satellites used to transmit GNSS signals. If a GNSS receiver receives a mixture of signals that consist of both "true" satellite signals and "false" satellite signals, then the GNSS receiver will be unable to accurately determine its position and may not be able to determine its position at all using the received data.

A false signal can take many forms. For example, multipath signals in which a satellite signal reaches the GNSS receiver by two or more paths (for instance if the satellite signal bounces off structures or the ground before reaching the GNSS receiver) can cause degradation in the accuracy of position, velocity, and time calculations for a GNSS receiver. Another type of false signal can be generated by malicious actors or "spoofers" who seek to generate their own GNSS signals in an attempt to fool the GNSS receiver into believing it is at a location that it is not actually at. Thus, in order to generate accurate position, velocity, and time calculations, the GNSS receiver should use a "consistent" set of signals and it needs to be able to exclude faulty navigation signals to ensure accurate PNT determination.

Excluding faulty signals however can be a difficult process. A typical GNSS receiver may receive multiple signals from different sources simultaneously. Some of those signals are signals that are directly transmitted by GNSS satellites, while others may be faulty signals. If the GNSS receiver uses a mixture of true and faulty signals to calculate its position, velocity, and time, then it may not be able compute accurate navigation solutions. One way to ensure accurate solutions is to ensure that the GNSS receiver is receiving a "consistent" set of signals for processing. A consistent set of signals can be defined as a set of signals that have likely been transmitted by one or more GNSS satellites in a constellation of GNSS satellites. However, selecting a set of signals that form a consistent set for PVT process can be challenging.

SUMMARY OF THE DISCLOSURE

Accordingly, systems and methods for generating a consistent set of signals to be processed by a PVT processor are disclosed herein. In one or more examples, a GNSS receiver can receive a plurality of signals from a plurality of signal sources. In one or more examples, the systems and methods can create a plurality of "seeds," based on the received signals with each seed representing a subset of the signals received by the GNSS receiver. In one or more examples, the seed can include the minimum number of signals needed to form a position, velocity and time (PVT) solution, typically 4 for a single constellation system, with pseudorandom number (PRN) codes indicating that the signals come from different satellites. The PVT solution can be solved exactly from the signals' pseudorange and pseudorange rate measurements from sets of equations with the same number of unknowns as number of equations.

In one or more example, each seed can then be expanded into one or more "atoms," by adding an additional signal to the seed from the received signals whose PRN codes indicate the signal is not from a satellite represented by the seed. Multiple atoms can be created from each seed such that every signal with PRN codes not from the satellites represented by the seed is represented by at least one atom that includes that seed. In one or more examples, for each atom, the calculated position and clock bias solution for the seed is applied to the pseudorange equation of the additional signal to estimate its measured pseudorange, and the velocity and clock drift solution for the seed is applied to the pseudorange rate equation for the additional signal to estimate its measured pseudorange rate. The estimated pseudorange and pseudorange rates are then compared with the measured pseudorange and pseudorange rates of the additional signal to generate pseudorange and pseudorange rate "residuals" that represents the difference between the calculated pseudorange and pseudorange rate and the measured pseudorange and pseudorange rate.

In one or more examples, each of the atoms belonging to a seed are then sorted based on a score calculated from their associated residuals, such that the atoms with the highest score will be processed first. In one or more examples, after sorting the atoms for a given seed based on their scores, the atom with the highest score can be processed to form a "cluster." In one or more examples, these scores represent the posterior log probability ratio (LPR) that the atom contains only true signals. The LPR is the log of the probability that all signals in the atom are true given the measurements minus the log of the probability that there is at least one false signal in the atom given the measurements. In one or more examples, a cluster can represent an atom (i.e., a set of signals representing a seed plus an additional signal) with potentially one or more additional signals added to the atom to form a cluster. An atom is the smallest possible cluster. In one or more examples, a cluster is built from an atom by adding a signal and then calculating a "cost" to add the signal. In one or more examples "a cost" can be calculated for adding the signal to a cluster and that cost can be compared to the cost of the cluster without adding the signal. If it is found that the cost of adding the signal to an atom or cluster is less than the cost of the cluster without the additional signal, then the signal can be added to the existing atom or cluster. Additional signals can be added to the cluster being built, until the cost function of adding an additional signal is found to be greater than the cost without the additional signal. In one or more examples, once this condition is found to be true, the process can terminate the cluster building process, and transmit the cluster to a PVT processor for further processor.

In one or more examples, after transmitting the cluster to the PVT processor, the systems and methods described herein can revert back to the sorted list of atoms and remove any atom that is a subset of the cluster already transmitted to the PVT processor. In one or more examples, once those atoms have been removed, the process can then select the next atom on the list (sorted from highest score to lowest score) and build another cluster to be transmitted to a PVT processor.

DETAILED DESCRIPTION OF THE DISCLOSURE

Figure 1:
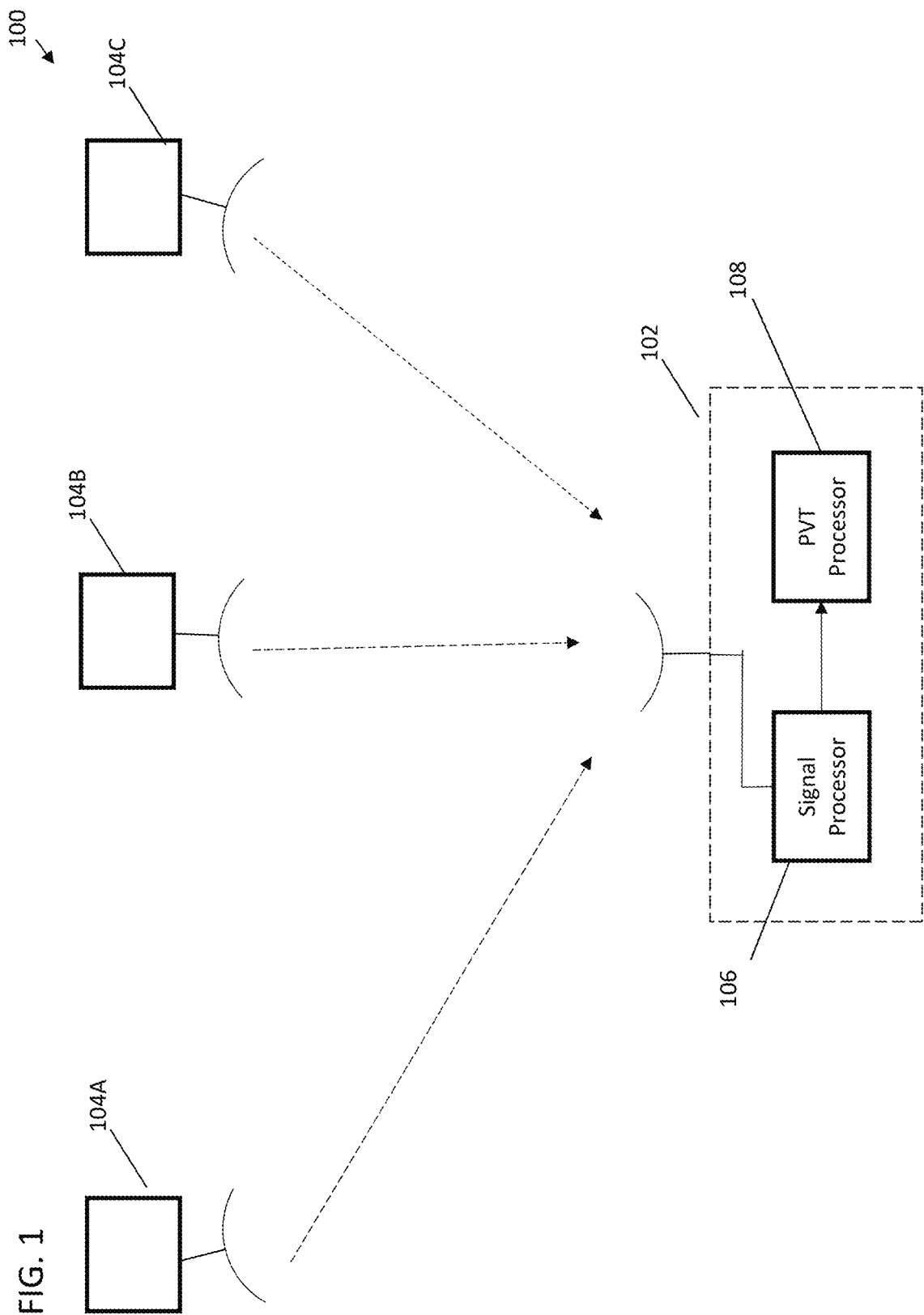
FIG. 1 illustrates an exemplary satellite navigation system according to examples of the disclosure.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present disclosure include process steps and instructions described herein in the form of an algorithm. It should be noted that the process steps and instructions of the present disclosure could be embodied in software, firmware, or hardware, and, when embodied in software, they could be downloaded to reside on and be operated from different platforms used by a variety of operating systems.

The present disclosure also relates to a device for performing the operations herein. This device may be specially constructed for the required purposes or it may comprise a general-purpose computer selectively activated or reconfigured by a computer program stored in the computer. Such a computer program may be stored in a non-transitory, computer-readable storage medium such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application-specific integrated circuits (ASICs), or any type of media suitable for storing electronic instructions and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

Satellite navigation is a process by which a receiver can communicate with a constellation of satellites to determine its own three-dimensional position in space. In one or more examples, a receiver can receive information from a plurality of navigation satellites to triangulate its position in three dimensional space. In one or more examples, a navigation receiver can be configured to receive speed-of-light signals from a plurality of orbiting satellite vehicles ("SV") that are used to help the receiver determine its position, speed, and local time. The core process for satellite navigation is "triangulation" which is a process wherein a receiver can measure its distance (also known as pseudorange) to a plurality of satellites with a known location and velocity. By finding the range to a first satellite, the receiver can know that its location is somewhere on a spherical region with a radius that is equal to the measured pseudorange to the one satellite. By calculating its pseudorange to more satellites whose positions and velocities are known, the receiver can determine its exact position to a higher degree of certainty. For instance, by calculating the pseudorange to two satellites, the receiver can ascertain that it is in a region where the two spheres of each satellite (calculated based on the pseudoranges to each satellite) overlap. Using three satellites can reduce the area of the region where the receiver might be located. Eventually, with enough satellites, the receiver can determine its precise location in three-dimensional space with a high degree of accuracy.

In one or more examples, if a receiver is trying to determine its three dimensional position in space (X,Y,Z) as well as its timing error, then if the receiver can triangulate its position with four separate satellites, it can solve for its three-dimensional position and timing error, since the position and clock bias equations have four unknown variables, and thus, by triangulating with four separate satellites, there will be four equations with four unknowns thus allowing for the receiver to determine its three-dimensional position and timing error. Similarly, by measuring the instantaneous change in pseudorange known as pseudorange rate for 4 satellites, the velocity and clock drift equations have 4 unknown variables, and thus, there will be four equations and four unknowns thus allowing for the receiver to determine its three-dimensional velocity, and the rate of change of its timing error.

FIG. 1 illustrates an exemplary satellite navigation system according to examples of the disclosure. In one or more example, the satellite navigation system 100 can include a receiver 102. In one or more examples, the receiver 102 can be a GNSS receiver configured to receive signals from one or more satellite constellations such as the global position system (GPS) constellation of satellites. The receiver 102 can be mounted to a moving structure such as an aircraft or a mobile device, and the receiver 102 can be used to determine the position of the moving structure to a high-degree of accuracy. As described above, in order to determine the position and local time of a satellite to a high degree of accuracy, the receiver 102 can receive communications from a plurality of satellites in a GNSS constellation such as GPS. Thus, in one or more examples, the satellite navigation system 100 can include a plurality of satellites 104A-C that can transmit signals to the receiver 102 so that the receive can triangulate the satellites to determine its position and local time.

In one or more examples, a satellite such as satellite 104A can transmit a message to receiver 102. The message transmitted can include orbital data (i.e., data relating to the position of the satellite) and the precise time that the data was transmitted. In one or more examples, the receiver 102 upon receiving the data and using the timing information from the signal, can calculate the pseudorange to the satellite (i.e., its distance to the satellite) based on how long it took for the signal to reach the receiver. The receiver 102 can determine the time it took for the signal to reach it by analyzing the timing data sent from the satellite and comparing it to its own internal clock to determine the transit time of the signal. By doing this process with multiple satellites (in one or more examples four satellites), the receiver 102 can determine its three-dimensional position in space and the error of its own internal clock to a high degree of accuracy.

As the receiver 102 receives signals from each of the satellites 104A-104C, it can process the signals using signal processor 106. In one or more examples, the signal processor 106 can determine the pseudorange to each satellite in the constellation based on the signals received from each of the satellites 104A-C and can use the determine pseudoranges to determine a PVT solution for the receiver 102. In one or more examples, the signal processor 106 can also be used to acquire the signals from each of the satellites by looking at the Doppler plane and locating the peaks that can be correlated against to determine which satellites are in range of the receiver 102. In one or more examples, the signal processor 106 can also prepare a set of signals to send to a tracking PVT processor such as an extended Kalman filter, in order to track the motion of the receiver and estimates the position of the receiver 102.

In one or more examples, the signal processor can package acquired satellite signals to form a "set" of signals that can then be transmitted to a PVT processor such as a Kalman filter to determine the position of the receiver 102. For instance, in one or more examples, the signal processor 102 can take a single signal from each of the satellites 104A-C in the constellation to create a set of signals for further processing by a PVT processor 108 such as an extended Kalman filter. In one or more examples, the receiver 102 can receive multiple signals from each satellite 104A-C, but can create a set such that a single signal from each satellite is represented in any given set. In this way, the PVT processor 108 can receive a set of signals (one from each satellite) and can calculate a PVT solution for the receiver as described above. The example 100 of FIG. 1 illustrates a constellation of three satellites 104A-C, however as described above, in order to solve for the X,Y,Z position of the satellite as well as its timing error, a fourth satellite may be required.

In order for the PVT processor 108 to produce accurate PVT solutions for a given receiver, the sets of signals sent to it from signal processor 106 may require a single signal from each satellite signal received by the receiver 102. In other words, each set sent to the PVT processor 108 will need to be a consistent set. A consistent set can be defined as a set of signals such that each signal in the set appears to come from a separate satellite in the constellation of satellites used to triangulate the position of the receiver 102, and the pseudorange and pseudorange residuals are small.

In the example of satellite navigation system 100, the creation of a consistent set can be a simple endeavor since the only signals received by receiver 102 are from satellites that all belong to a single constellation of satellites. Thus, in order to create a consistent set, the signal processor 106 only has to ensure that the set sent to PVT processor 108 includes a single signal from each satellite in the constellations. However, in a real-world scenario, creating a consistent set for a PVT processor may not be so simple.

Figure 2:
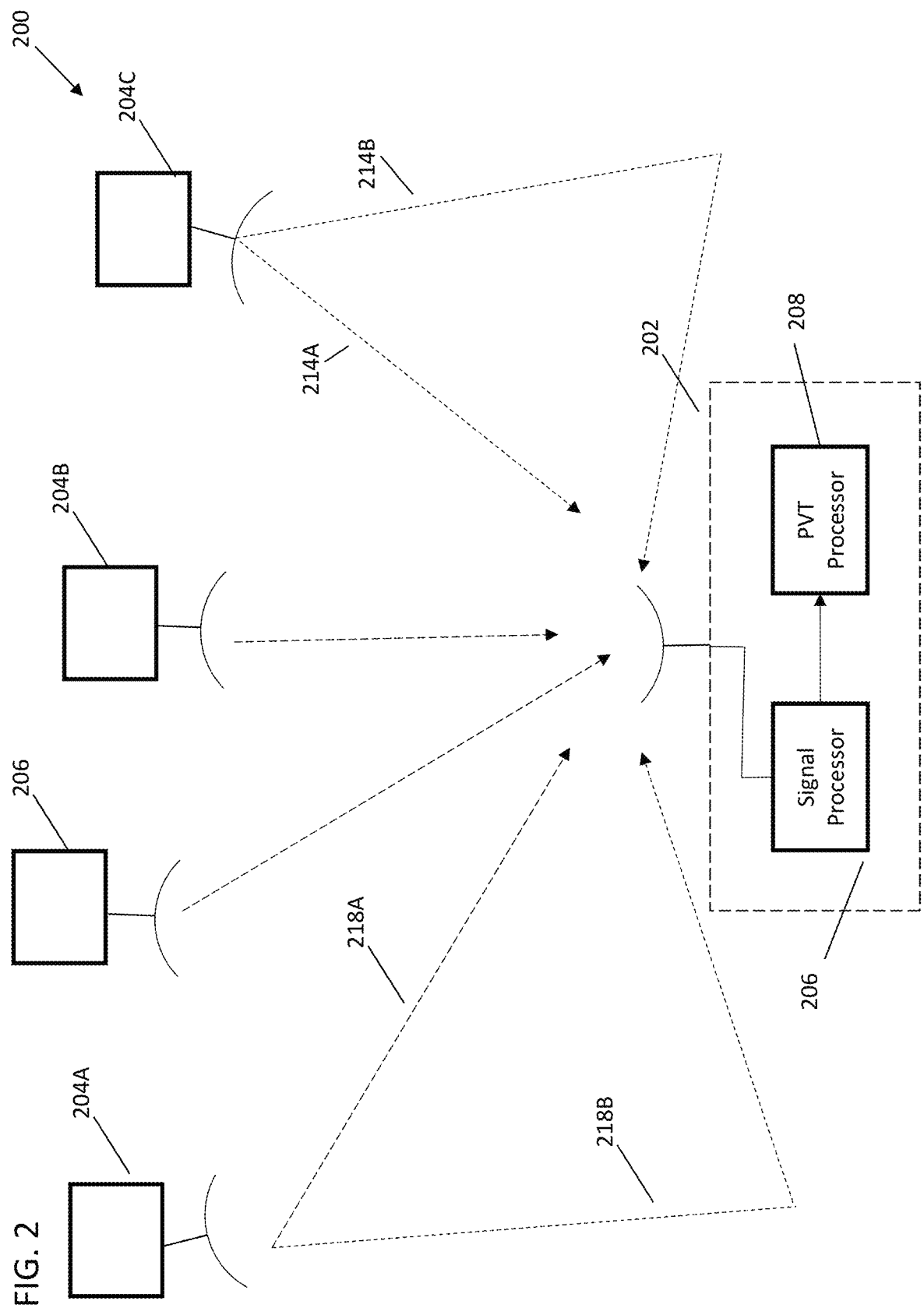
FIG. 2 illustrates another exemplary satellite navigation system according to examples of the disclosure.

FIG. 2 illustrates another exemplary satellite navigation system according to examples of the disclosure. In one or more examples, the satellite navigation system 200 can include a receiver 202 that can be configured to receive navigation signals from a constellation of GNSS satellites configured to transmit information to the receiver 102 so that it can determine its position in three-dimensional space and also its own clock error. In one or more examples, the satellite navigation system 200 can include satellites 204A-C that make up the GNSS constellation, and which are substantially similar to the satellites 104A-C described above with respect to FIG. 1.

In addition to receiving signals directly from the GNSS satellites 204A-C, the receiver 202 may receive additional signals that are not intended to allow for the receiver 202 to use for the purposes of ascertaining its true position. For instance, while satellite 204A may transmit a signal directly to receiver 202 in order to allow receiver 202 to ascertain its pseudorange with respect to satellite 204A as depicted at 218A, it may also transmit a signal that experiences multipath propagation that bounces off a surface (such as the ground) before impinging on the receiver 202 as depicted by 218B. Receiver 202 can also receive two separate signals from satellite 204C. A first directly transmitted signal 214A that can be used to help the receiver 202 determine its location, and a multipath signal 214B, that as described in further detail below, can interfere with the receiver's ability to determine its own position. In one or more examples, some satellites in the constellation 204A-C may not contribute any multi-path signals such as depicted with respect to satellite 204B which only transmits a single signal 210 to receiver 202.

In one or more examples, receiver 202 may receive a signal from a satellite 206 that is not part of the GNSS constellation 204A-C, but may nonetheless transmit information to the receiver that would make the receiver believe that the satellite 206 is from a legitimate GNSS satellite. In one or more examples, a satellite such as the one depicted 206 may belong to a malicious actor who is attempting to spoof a satellite (i.e., pass itself off as one or more legitimate GNSS satellites) for the purpose of making the receiver believe it is a position that does not represent its true position.

As will be described below, the presence of multipath signals and other satellite signals can make it difficult for a receiver to acquire a consistent set of signals that it can transmit to a PVT processor for the purpose of tracking its position and motion. To better understand how the presence of extraneous signals can interfere with the ability of a PVT process to track position and motion, understanding the process of gathering input data for a PVT process can be helpful.

Figure 3:
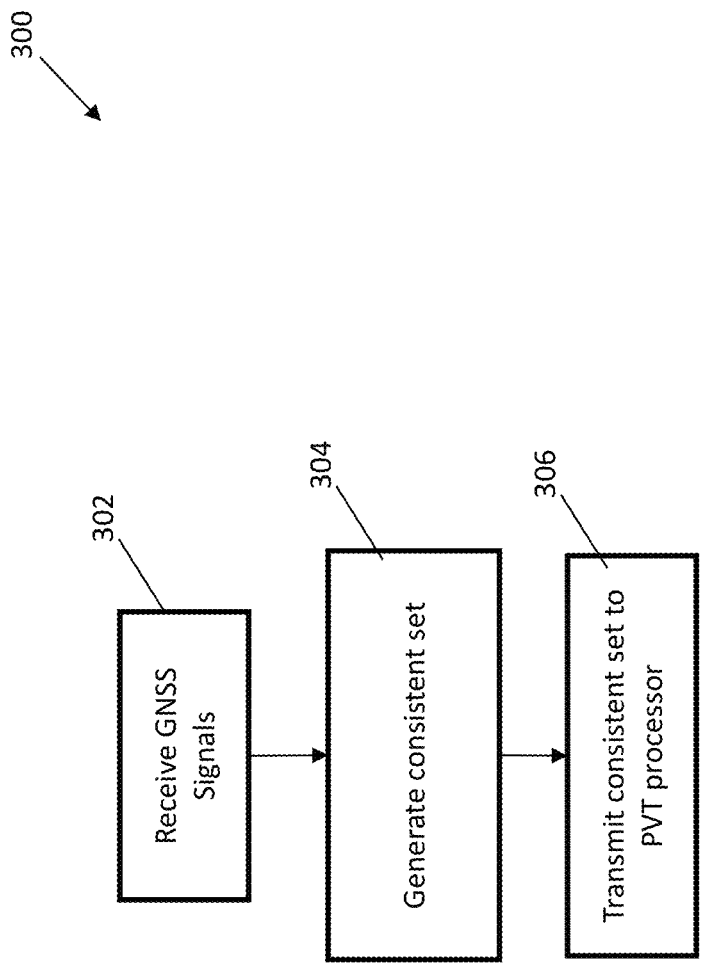
FIG. 3 illustrates an exemplary GNSS signal processing process according to examples of the disclosure.

FIG. 3 illustrates an exemplary GNSS signal processing process according to examples of the disclosure. In one or more examples, the process 300 of FIG. 3 illustrates an exemplary process for acquiring and packaging of signals acquired by a GNSS receiver for further processing by a PVT processor such as an extended Kalman filter. In one or more examples, the process 300 can begin at step 302 wherein a GNSS receiver (such as the one described above with respect to the examples of FIGS. 1-2) receives a plurality of signals from a plurality of sources. In one or more examples, the plurality of sources can represent legitimate (i.e., "true" signals) acquired from GNSS satellites in orbit that are configured to transmit messages to a GNSS receiver for the purpose of allowing the receiver to determine its position. In one or more examples, the plurality of sources can also represent illegitimate signals (i.e., "false" signals) acquired as a result of multipath propagation as described above, or from spoofers as also described above.

In one or more examples, each source can produce multiple discrete signals over a given period of time, such that there are a plurality of signals received at step 302 by the receiver over a given time period. In one or more examples, and as briefly described above, in order to allow the PVT processor to triangulate the position of the receiver, the process 300 can find a PVT solution for a given receiver by finding its pseudorange to a plurality of satellites and triangulating its position based on the determined pseudorange as well as information about the orbit and velocity of the transmitting satellites. In one or more examples, the process of determining a receiver's position can include determining its X,Y,Z position in space as well as the receiver's clock error. By using four signals from four distinct satellites, there will be four equations and four unknowns (X,Y,Z, clock error) that can be solved using Newton's method to determine a PVT solution. Thus, in one or more examples, in order to provide a PVT processor with enough information to generate a PVT solution, the process 300 after receiving the signals at step 302 can move to step 304 wherein the process generates a consistent set of signals to transmit to a PVT processor for further processing.

In one or more examples, the goal of step 304 of process 300 can be two-fold: (1) to provide the PVT processor with as many signals as possible that it can use to triangulate the position of the receiver; and (2) to transmit a consistent set of signals to the PVT processor so that it can accurate estimate the position of the receiver and track both its position and velocity. With respect to the first goal, providing the PVT with as many signals as possible so that it can triangulate the position of a receiver can help to reduce the uncertainty in any position estimate it generates. For instance, and as described above, a PVT processor may need a minimum of four signals from four separate satellite vehicles in order to derive a PVT solution for the receiver (since there are four unknowns). However, simply providing the PVT processor with only four signals may lead to an uncertainty in the PVT solution. As an example, a PVT solution using only four signals may yield a PVT solution with an uncertainty of + or −12 meters. However, if more signals are added to the set (i.e., five or six or seven) then the uncertainty may be reduced. For instance adding a fifth signal may reduce the uncertain to + or −5 meters. Thus one of the goals of the process 300 can be to provide the PVT processor with as many signals as possible.

However, providing more signals to the PVT processor can be in tension with the second goal of process 300 which is to transmit a set of consistent signals to the PVT processor. As described above, a consistent set can be defined as a set of signals in which each signal of the set appears to originate from a true satellite vehicle that is transmitting navigation data to the receiver. Examples of a false signal include multipath signals or signals from other constellations of satellites such as those from a spoofer. Every time a signal is added to a set, the chance the set is consistent becomes less. In other words the more signals that are added to a set, the more likely it is that one or more of the signals in the set is a false signal. Using a set with a false signal can cause the PVT processor to generate an inaccurate estimate of the receiver's position, since the input data to determine the receiver's position is inaccurate. For instance, if a set contains a multipath signal, then the estimate of the position will assume that the receiver received a separate signal from a separate satellite, even though the multipath signal may be transmitted by the same satellite vehicle as a true signal received by the receiver. The receiver may not be able to distinguish a multipath signal from a true signal and thus may consider the multipath signal to be another separate satellite signal that it can use triangulate its position.

In an ideal setting, such as the one depicted in FIG. 1, increasing the number of signals in a set may be free of consequences if it is known that every signal received by the receiver has been transmitted by a satellite in the constellation of GNSS satellites. However, in the more real-word scenario of FIG. 2, adding signals to the set carries a risk that the added signal will introduce error in the PVT solution. In one or more examples, a signal processor (such as the signal processor 106) may perform a method to generate likely consistent sets that it can then transmit to a PVT processor, which will be described in detail below. However, returning to the process 300 of FIG. 3, once a consistent set is generated for a PVT processor at step 304, the process can move to step 306 wherein the consistent set is transmitted to a PVT process for further processing, and to ultimately generate a PVT solution for the receiver.

Figure 4:
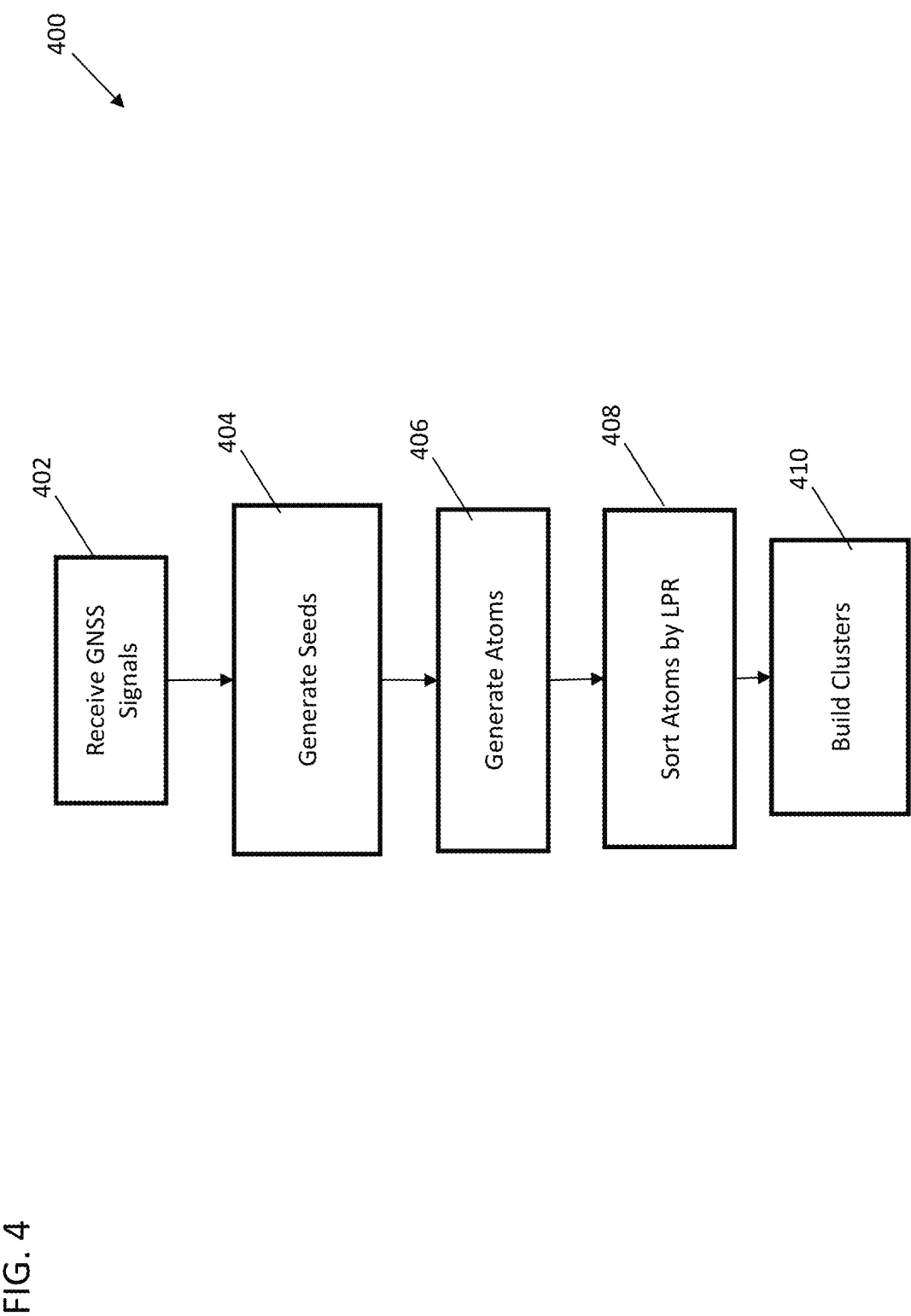
FIG. 4 illustrates an exemplary process for generating consistent signals sets for a PVT processor according to examples of the disclosure.
Figure 5:
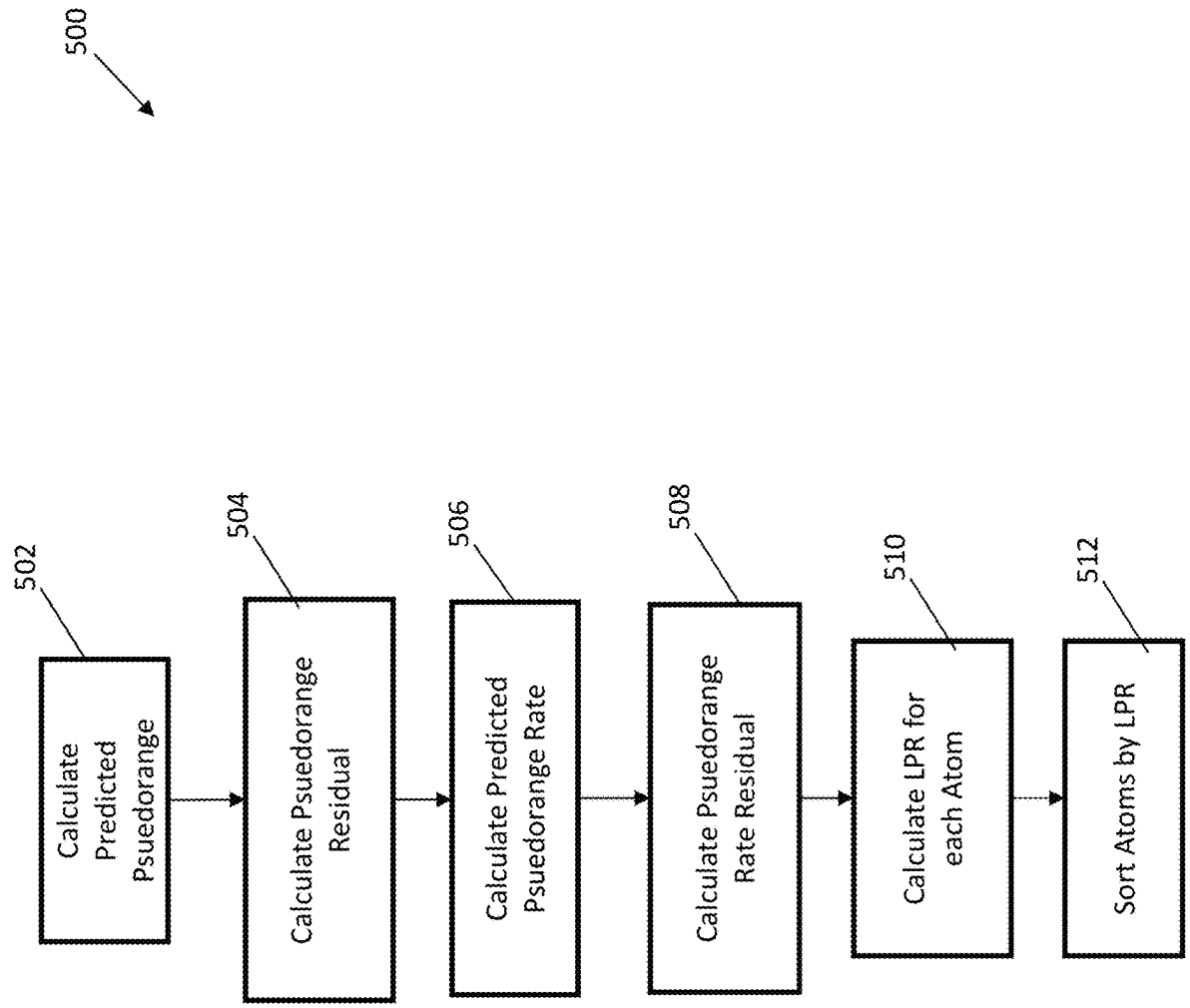
FIG. 5 illustrates an exemplary process for sorting atoms within a process for generating a consistent signal set for a PVT processor according to examples of the disclosure.
Figure 6:
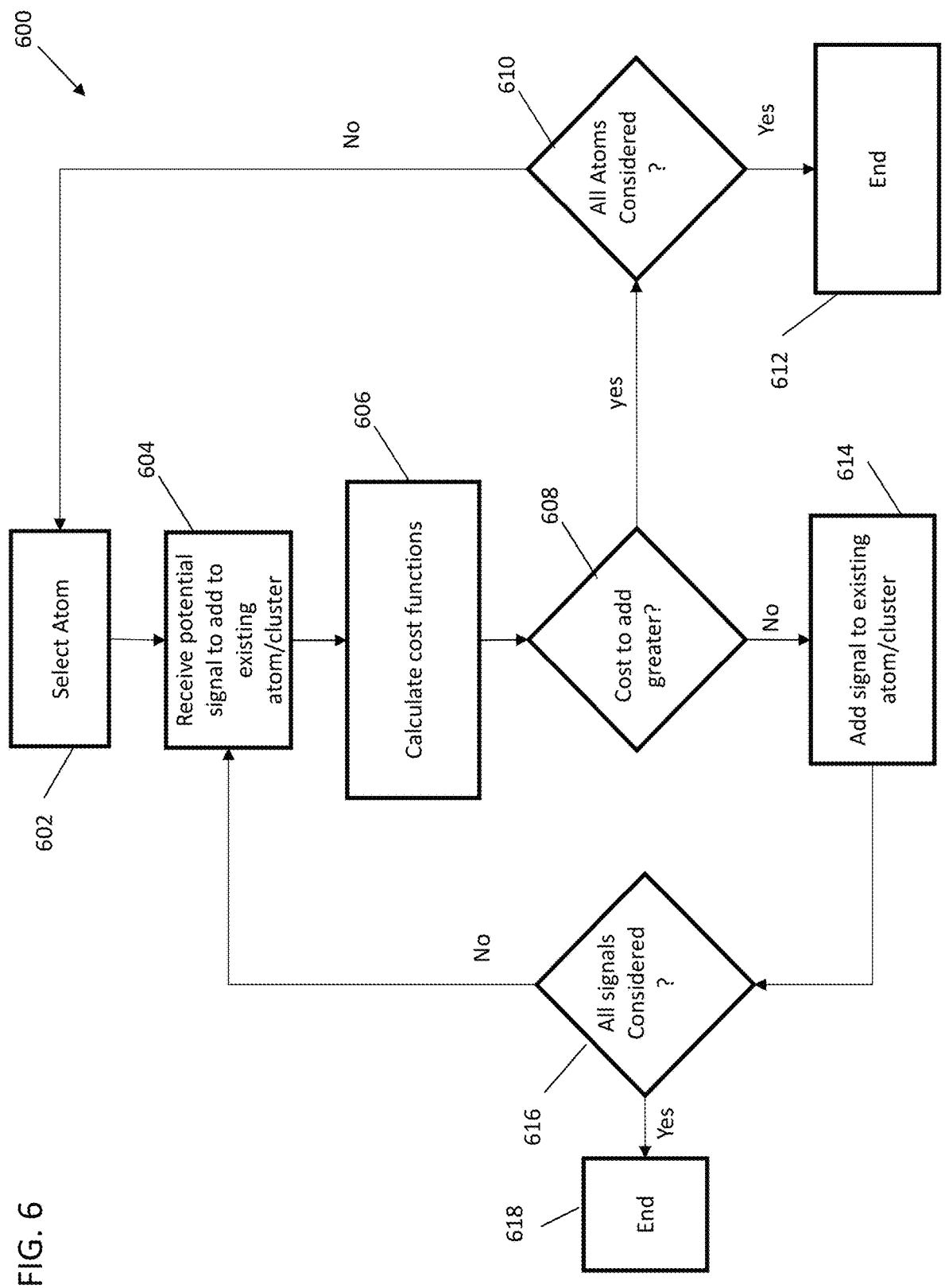
FIG. 6 illustrates an exemplary process for building a cluster within a process for generating a consistent signal set for a PVT processor according to examples of the disclosure.

As described above, GNSS receivers need to be able to exclude fault navigation signals to ensure accurate PVT solutions for a given receiver. Also as described above, these faults can be satellite faults, multipath signals, or deliberate spoofing of multiple signals. Described in detail below with respect to FIGS. 4-6 is a method for sampling, evaluating, finding, and expanding consistent sets of GNSS signals in the presences of faults (such as the scenario described above with respect to FIG. 2). In one or more examples, a consistent set can be defined such that residuals (i.e., the difference between an estimated value and a measured value) have small magnitudes. In one or more examples, a residual can be defined as the difference between an actual measurement and a predicted measurement obtained by applying a set's PVT solution to the pseudorange and pseudorange rate equations for a single signal.

As described in detail below, Bayesian inference can be applied to score sets using a metric that can be monotonic with the posterior probability that set is true, where (as described above) truth can be defined as a signal in the set coming from a direct line-of-sight (LOS) reception from an actual GNSS satellite rather than a faulty signal. As described in further detail below, sets can be evaluated and sorted by using a cost function to score the set. Signals from satellite faults are unlikely to produce small residuals, however, since a spoofer is expected to attempt to create a consistent set of signals, it is entirely possible or even likely that the set of signals with the highest posterior probability of being true are from the spoofer rather than a set of true signals. Nonetheless, the goal of the process described below is to score sets so as to potentially identify several consistent sets, one of which is likely to be a true set, to pass to a collection of PVT processors.

In order to understand the process for generating consistent sets described in detail below, a few concepts and terminology can first be introduced in order to facilitate a more comprehensive discussion of the systems and methods described below.

Notationally, $(x^*, b^*)$ can be defined as the true position and clock bias of the receiver, and $(v^*, \dot{b}^*)$ can be defined as the true velocity and clock drift of the receiver.

Let N be the number of satellite vehicles (SV) (true of false) indexed by $n=1, \ldots, N$. Thus $SV_n$ can represent the n-th SV.

Let $M_n$ be the number of signals being traced from $SV_n$ that produce pseudorange and pseudorange rate measurements.

Let $q_n$ be the discrete random variable taking on one of $M_n+1$ values that can indicate which one if any of the signals for $SV_n$ is a true signal. Thus, for m>0, $q_n=m$ is the condition that the m-th signal is the one true signal from $SV_n$, whereas $q_n=0$ is the conditions that all signals being tracked from $SV_n$ are false.

Let $P(q_n)$ denote the probability mass function (PMF) for $q_n$. Throughout the disclosure letter P can be used denote PMFs for discrete random variables, probability density functions (PDF) for continuous random variables, and for likelihood functions which take on the form of an underlying probably distribution but are functions that can be evaluated from data.

Let $S_{nm}$ be a Boolean random variable serving as a truth indicator where, by convention, truth can be represented as "1". Form >1 $S_{nm}$ can indicate whether the m-th signal from $SV_n$ is true. $S_{n0}=1$ indicates that all signals being tracked from $SV_n$ are false. $S_{nm}$ is related to qn by a Boolean conditional function $$S_{nm}=(q_n==m) \qquad \text{(Equation 1)}$$

In equation 1 above, the "==" symbol can be the conditional operator which can return a 1 if the left hand and right hand sides are equal and 0 otherwise.

Let $\rho_{nm}$ be the corrected pseudorange measurement for the m-th signal being tracked from $SV_n$ after removing known biases such as ionopheric and tropospheric errors, and satellite clock.

Let $\dot{\rho}_{nm}$ be the pseudorange rate measurement for the m-th signal being tracked from $SV_n$ after removing known biases.

Let $\sigma_{nm}$ be the known or assumed standard deviation of the corrected pseudorange measurement $\rho_{nm}$.

Let $\bar{\sigma}_{nm}$ be the known or assumed standard deviation of the corrected pseudorange measurement $\dot{\rho}_{nm}$.

Let $x^{(nm)}$ be the position of $SV_n$ as calculated from ephemeris from the m-th signal.

Let $v^{(nm)}$ be the position of $SV_n$ as calculated from ephemeris from the m-th signal.

As will be described further below, the systems and methods of the present disclosure can generate one or more "seeds" as part of the process of generating a consistent set. In one or more examples, a seed can represent a set of four tracked signals from distinct SVs (i.e. four different satellites) for which a PVT solution can be calculated.

The k-th seed can be defined by the set of (SV, signal) index pairs from the four signals:

$$\{(n_{k1}, m_{k1}), (n_{k2}, m_{k2}), (n_{k3}, m_{k3}), (n_{k4}, m_{k4})\}$$

In one or more examples, the k-th seed's truth indicator sk can be defined as the Boolean random variable that is the Boolean product (AND operator), of the signal truth indicators for signals represented in the seed as defined by the equation below:

$$s_k=S_{n_{k1}m_{k1}}S_{n_{k2}m_{k2}}S_{n_{k3}m_{k3}}S_{n_{k4}m_{k4}} \qquad \text{(Equation 2)}$$

$(x_k, b_k)$ can be the three-dimensional position and clock bias solution calculated using the corrected pseudorange measurements from the four signals constituting the k-th seed.

$(v_k, \dot{b}_k)$ can be the three-dimensional velocity and clock drift solution calculated using the corrected pseudorange rate measurements from the four signals constituting the k-th seed.

As will be described further below, the systems and methods of the present disclosure can generate one or more "atoms" as part of the process of generating a consistent set. In one or more examples, an atom can include a seed and one additional signal whose (SV, signal) index (n,m) is such that $SV_n$ is not one of the four SVs used to make the seed.

Let $a_{knm}$ be the Boolean random variable indicating the truth of the atom. Notationally, in the examples described below, the disclosure distinguishes the truth indicators for seeds and atoms such that the seed's truth indicator has one subscript and the atom's truth indicator has three subscripts. Mathematically $a_{knm}$ is given by:

$$a_{knm} = s_k S_{nm} \quad \text{(Equation 3)}$$

Let $\hat{\rho}_{knm}$ be the pseudorange prediction obtained from applying the solution $(x_k, b_k)$ to the pseudorange equation for a signal associated with $S_{nm}$.

Let $\hat{\dot{\rho}}_{knm}$ be the pseudorange prediction obtained from applying the solution $(v_k, \dot{b}_k)$ to the pseudorange equation for a signal associated with $S_{nm}$.

Let the residual between the measured pseudorange from the signal associated with $S_{nm}$ and the pseudorange prediction resulting from applying the seed's position, clock bias solution $(x_k, b_k)$ to the pseudorange equation for the signal associated with $S_{nm}$ be represented as $d_{knm} = \rho_{nm} - \hat{\rho}_{knm}$.

Let the residual between the measured pseudorange rate from the signal associated with $S_{nm}$ and the pseudorange rate prediction resulting from applying the seed's velocity and clock drift solution $(v_k, \dot{b}_k)$ to the pseudorange equation for the signal associated with $S_{nm}$ be represented as $\dot{d}_{knm} = \dot{\rho}_{nm} - \hat{\dot{\rho}}_{knm}$.

An atom can also be defined as the smallest set for which the process described below can calculate a log-likelihood function which can be a function of $d_{knm}$ if only pseudorange measurements are available, or from both $d_{knm}$ and $\dot{d}_{knm}$ if pseudorange rate measurements are available.

As will be described further below, the systems and methods of the present disclosure can generate one or more "clusters" as part of the process of generating a consistent set. In one or more examples, a cluster is a set of at least five signals that is a candidate to be considered a consistent set. The Boolean random variable $c_j$ is the truth indicator of the j-th cluster obtained from applying the AND operator to the truth indicators from its constituent members (described above). Atoms are the smallest clusters. Larger clusters may need additional observables to evaluate posterior probabilities of being a true set. Notationally, and in examples of the disclosure, the vector of aggregated observables for the j-th cluster can be defined as $d_j$. The elements of $d_j$ can be either pseudorange residuals or pseudorange rate residuals. As will be described in detail below, using Bayesian inference, a goal of the systems and methods described herein can be to evaluate the equivalent of the probability of a cluster being true given observed pseudorange and pseudorange rate residuals.

As discussed above, one way to generate a consistent set for a PVT processor (i.e., a set whose residuals are small when the sets solution is applied to the pseudorange and pseudorange rate equations) is to evaluate the posterior probabilities of hypotheses, i.e., the truth of clusters represented by Boolean random variables, from evidence in the form of residuals (which can be assumed to be continuous and Gaussian). If H is the event that the hypothesis is true (i.e., that signals forming a cluster are all true), and E is the evidence (i.e., the residuals for both pseudorange and pseudorange rate), Bayes rule can be expressed as equation 4 below:

$$P(H \mid E) = \frac{P(E \mid H) P(H)}{P(E)} \quad \text{(Equation 4)}$$

P(E) can represent the marginal likelihood, which can be a normalizing term and can be expressed as equation 5 below:

$$P(E) = P(E \mid H) P(H) + P(E \mid \overline{H}) P(\overline{H}) \quad \text{(Equation 5)}$$

In equation 5 above, the overbar above H can indicate the complement of H. P(H) can represent that prior probability for a hypothesis (also referred to as the "prior.") P(E|H) can represent that likelihood function of the evidence. While being derived from a probability density function, the likelihood function may not be a density but rather a function that is evaluated from evidence. P(H|E) can represent the posterior or updated probability of the hypothesis in light of the evidence.

Also using Bayes Rule, the posterior of the complement of H (i.e., H overbar) can be expressed as equation 6 below:

$$P(\overline{H} \mid E) = \frac{P(E \mid \overline{H}) P(\overline{H})}{P(E)} \quad \text{(Equation 6)}$$

Bayes rule is often used in log form because log-likelihood functions involving evidence in the form of Gaussian observables are quadratic functions of the observables. In log form Bayes rules can be expressed as equation 7 below:

$$\underbrace{\log P(H \mid E)}_{\text{log posterior}} = \underbrace{\log P(E \mid H)}_{\text{log likelihood}} + \underbrace{\log P(H)}_{\text{log prior}} - \underbrace{\log P(E)}_{\text{log marginal likelihood}} \quad \text{(Equation 7)}$$

For Boolean random variable, the densities can be conveniently represented by probability ratios which eliminate the log marginal likelihood. Thus, by dividing equations 4 and 6, the result can be expressed as equation 8:

$$\underbrace{\frac{P(H \mid E)}{P(\overline{H} \mid E)}}_{\text{Posterior probability ratio}} = \underbrace{\frac{P(E \mid H)}{P(E \mid \overline{H})}}_{\text{Likelihood ratio}} \cdot \underbrace{\frac{P(H)}{P(\overline{H})}}_{\text{Prior probability ratio}} \quad \text{(Equation 8)}$$

Converting to the log domain, equation 8 can be expressed as equation 9 below:

$$\underbrace{\log P(H \mid E) - \log P(\overline{H} \mid E)}_{\text{Posterior probability ratio}} = \quad \text{(Equation 9)}$$

$$\underbrace{\log P(E \mid H) - \log P(E \mid \overline{H})}_{\text{Log likelihood ratio}} + \underbrace{\log P(H) - \log P(\overline{H})}_{\text{Prior log probability ratio}}$$

Log probability ratios (LPR) and log-likelihood ratios (LLR) can be interpreted in a manner that can be useful to generating consistent sets for a PVT processor. A positive sign of the LPR can indicate that the hypothesis is more likely to be true than false and vice versa. The magnitude of the LPR, often called the reliability, indicates how confident one can be in that decision. In the discussion that follows, we will compute LLRs from which we compute posterior LPRs. Although we can convert the posterior LPR into a posterior probability, for the purposes of computing cost functions that are expectations (as described below), an LPR is monotonic with the probability that the hypothesis is true and thus our metric for scoring sets of 5 signals is posterior LPR. Notationally, we will use the symbol L to represent both LPRs and LLRs in the same manner that the symbol P is used to represent both probabilities and likelihood functions.

Given the concepts described above, what follows is a process for generating consistent sets for a PVT processor, by generating and scoring clusters and providing the clusters that are most likely to be true to PVT processors for further processing.

FIG. 4 illustrates an exemplary process for generating consistent signal sets for a PVT processor according to examples of the disclosure. In one or more examples, the process 400 illustrated in FIG. 4 can begin at step 402 wherein a plurality of signals from a plurality of sources is received at a receiver as discussed above with respect to step 302 of FIG. 3. Once all of the signals have been received at step 402, the process 400 can move to step 404 wherein one or more "seeds" are generated. In one or more examples, a seed can represent a set of four tracked signals from distinct SVs (i.e. four different satellites) for which a PVT solution can be calculated. A seed can require four distinct signals due to the fact that a pseudorange estimation equation will contain four unknowns and thus, four separate signals can be required in order to solve for the unknowns.

Equation 10 provided below illustrates an exemplary pseudorange measurement expression according to examples of the disclosure:

$$\rho_{nm} = \|x^{(nm)} - x^*\| + b^* + \epsilon_{nm} \quad \text{(Equation 10)}$$

In equation 10 above, $\rho^{nm}$ represents the measured pseudorange of a satellite based on the amount of time it takes a signal transmitted from a GNSS satellite to reach the receiver (calculated using the timing information from the GNSS satellite and the receiver), $x^{(nm)}$ can represent the position of the GNSS satellite as calculated from the ephemeris decoded from a signal received from the satellite. x* can represent the three-dimensional (X,Y,Z) position of the receiver, b* can represent the bias component of pseudorange due to the true receiver clock offset, and $\epsilon_{nm}$ can represent the measurement error which is assumed to be a zero Gaussian random variable.

Pseudorange can be both calculated and estimated. As described above $\rho^{nm}$ can be measured, and the measured value should match the right side of equation 10, however the right side of equation 10 has four unknowns, the (X,Y,Z) position of the satellite as well as the clock bias. Thus, in order to solve for the (X,Y,Z) position of the satellite and the clock bias, a seed can be generated using four signals. Since there are four unknowns in equation 10, the seed can be used to solve for the (X,Y,Z) position of the satellite as well as the clock bias.

In one or more examples, the receiver receives multiple signals from multiple sources, however a seed represents four distinct signals from four separate satellites (this is required to solve for (X,Y,Z) and clock bias as described above.) In one or more examples, a seed can be generated at random, simply picking four signals from four distinct satellites (i.e., a signal from each satellite) to generate a seed.

Once one or more seeds have been generated at step 404, the process 400 can move to step 406, wherein the position and clock bias solution of the receiver can be calculated using equation 10 described above as well as the velocity and clock drift of the receiver can be calculated as described below. In one or more examples, and as described above, the (X,Y,Z) position of the receiver as well as the clock bias of the receiver can be calculated by solving the four pseudorange equates given by equation 10 for the position and clock bias solution. Based on the calculated (X,Y,Z) position of the receiver and the calculated clock bias, at step 406, four unit vectors can be calculated using equation 11 below:

$$u_{kl} = \frac{x^{(n_l m_l)} - x_k}{\|x^{(n_l m_l)} - x_k\|}, l = 1, 2, 3, 4 \quad \text{(Equation 11)}$$

From the unit vectors calculated according to equation 11 above, a geometry matrix can be formed as defined by equation 12 below:

$$G_k \triangleq \begin{bmatrix} -u_{k1} & 1 \\ \vdots & \vdots \\ -u_{k4} & 1 \end{bmatrix} \quad \text{(Equation 12)}$$

If $s_k=1$ then $(x_k, b_k)$ can be sufficiently close to (x*,b*) so that a linearization can be written around $(x_k, b_k)$ to express the solution error as a function as a function of the pseudorange error vector for the signals in the k-th seed as defined by equation 13 below:

$$\begin{bmatrix} \Delta x_k \\ \Delta b_k \end{bmatrix} \triangleq \begin{bmatrix} x_k - x_* \\ b_k - b_* \end{bmatrix} = (G_k^T G_k)^{-1} G_k^T \epsilon_k \quad \text{(Equation 13)}$$

In equation 13 above, $\epsilon_k$ can be assumed to be a zero mean Gaussian random variable with a covariance of $W_k$, where the covariance of the pseudorange measurement errors Wk can be typically diagonal since these measurement errors are assumed to be uncorrelated. The position, clock bias solution error covariance matrix for $(x_k, b_k)$ can thus be given by equation 14 below:

$$P_k = (G_k^T G_k)^{-1} G_k^T W_k G_k (G_k^T G_k)^{-1} \quad \text{(Equation 14)}$$

Calculating the pseudorange solution using a seed will allow for "atoms" to be built from the seeds and will help to provide evidence as to whether a set of signals is true or false. As will be described in detail below, when an atom is built from a seed, the process 300 can include computing pseudorange predictions from signals indexed by (SV, signal)=(n,m) from SVs not represented in the k-th seed as defined by equation 15 below:

$$\hat{\rho}_{knm} = \|x^{(nm)} - x_k\| + b_k \quad \text{(Equation 15)}$$

In equation 15 above, the pseudorange of the satellite not belonging to the seed (but part of the atom) can be represented by $\hat{\rho}_{knm}$. $x^{(nm)}$ can represent the position of the transmitting satellite, $X_k$ can represent the three dimensional (X,Y,Z) position of the receiver (which can be calculated from the seed) and the clock bias (which can also be calculated from the seed). Thus, the pseudorange residual (i.e., the difference between the measured pseudorange of a satellite not in the seed and the estimated pseudorange given by equation 15 above) can be expressed using equation 16 below:

$$d_{knm} \triangleq \rho_{nm} - \rho_{knm}$$

$$= \|x^{(nm)} - x_*\| - \|x^{(nm)} - x_k\| + (b_* - b_k) + \epsilon_{nm}$$

$$= \|x^{(nm)} - x_k + \Delta x_k\| - \|x^{(nm)} - x_k\| - \Delta b_k + \epsilon_{nm}$$

(Equation 16)

The unit vector from $X_k$ to the n-th SV's position as determined from the ephemeris of the m-the signal can be given by equation 17 below:

$$u_{knm} = \frac{x^{(nm)} - x_k}{\|x^{(nm)} - x_k\|}$$

(Equation 17)

The geometry vector can be expressed using equation 18 below:

$$g_{knm} = [-u_{knm} \ 1]$$

(Equation 18)

The pseudorange residual can be approximated by a linear function of pseudorange measurement errors as shown in equation 19 below:

$$d_{knm} \approx \epsilon_{nm} - g_{knm} \begin{bmatrix} \Delta x_k \\ \Delta b_x \end{bmatrix} = \epsilon_{nm} - g_{knm}(G_k^T G_k)^{-1} G_k^T \epsilon_k$$

(Equation 19)

For the case of true signals, the residual $d_{knm}$ can thus be treated as a zero mean Gaussian random variable with variance expressed by equation 20 below:

$$\sigma_{dnm}^2 \triangleq \text{var}(d_{knm}) = \sigma_{nm}^w + g_{knm} P_k g_{knm}^T$$

(Equation 20)

For the hypothesis that an atom is true (i.e., all the signals in the atom (the four signals of the seed and the additional signal)), the log-likelihood function for the evidence provided by $d_{knm}$ can be given by equation 21 below:

$$\log P(d_{knm} | a_{knm} = 1) = -\frac{d_{knm}^2}{2\sigma_{dnm}^2} - \log \sigma_{dnm}^2 - \frac{1}{2}\log 2\pi$$

(Equation 21)

To compute both the log-likelihood ratio or the marginal likelihood, in one or more examples, an underlying probability density function for the case when the atom is false can be assumed. If there is a false signal in the atom (i.e., one of the signals is sourced from a multi-path signal or spoofer), then the underlying distribution of the resulting fault may not be known. Nonetheless, it can be assumed that in the case of an atom containing a false signal, the expected value of the residual is the residual itself, as it represents the fault. However, instead, if the assumption is made that the distribution is Gaussian and the variance is the same as for the true signal then for the case where the atom is false the residual can be modeled as a Gaussian random variable with a mean equal to the residual and a variance represented as $\sigma_{dnm}^2$. In this case, the log-like likelihood function for the case of a false atom may always exceed the log-likelihood function for the true atom because the quadratic term of the log-like likelihood function for the false case can always be zero, where the quadratic term for the log-likelihood for the true atom may only be upper bounded by zero. Furthermore, the additional scaling terms outside the Gaussian's density's exponential cancel out with those of the log-likelihood function for the case where the atom is true. Therefore, equation 21 can be rewritten as equation 22 below:

$$\log P(d_{knm} | \sigma_{knm} = 0) = -\log \sigma_{dnm}^2 - \frac{1}{2}\log 2\pi$$

(Equation 22)

Since the quadratic term is zero, the LLR can take the simple quadratic form show below in equation 23:

$$L(d_{knm} | a_{knm}) = \log P(d_{knm} | a_{knm} = 1) - \log P(d_{knm} | a_{knm} = 0)$$

$$= -\frac{d_{knm}^2}{2\sigma_{dnm}^2}.$$

(Equation 23)

Thus the prior LPR for $a_{knm}$ can be given by equation 24 below:

$$L(a_{knm}) \triangleq \log \frac{P(a_{knm} = 1)}{P(a_{knm} = 0)}$$

$$= \log \frac{P(s_k = 1)P(S_{nm} = 1)}{P(s_k = 0)P(S_{nm} = 0) + P(s_k = 0)P(S_{nm} = 1) + P(s_k = 1)P(S_{nm} = 0)}$$

$$= L(s_k) + L(S_{nm}) - \log(1 + e^{L(m)} + e^{L(S_{nm})}),$$

(Equation 24)

Where $L(s_k)$ and $L(S_{nm})$ are the prior LPRs for the seed and the signal represented by $S_{nm}$. Adding the log prior to the LLR, the posterior LPR can be obtained according to equation 25 below:

$$L(a_{knm}|d_{knm}) = L(d_{knm}|a_{knm}) + L(a_{knm})$$

(Equation 25)

As demonstrated above, using the pseudorange measurement to each of the satellites in a set can allow for a estimation of the three-dimensional position (X,Y,Z) of the satellite, which can then be subsequently used when creating an atom to generate evidence as to how likely it is that the signals in the atom form a consistent set. Additionally, and as described in detail below, pseudorange rate measurements can also be used as additional evidence as to the likelihood that an atom is a consistent set.

Pseudorange rate can refer to the velocity of the receiver as determined from the relative position and velocities of the GNSS satellites used to triangulate the position of the satellite. The equation for compensated pseudorange rate measurement can be defined according to equation 26 below:

$$\dot{\rho}_{nm} = u_{knm}^T(v^{(nm)} - v^*) + \dot{b}^* + \bar{\epsilon}_{nm}$$

(Equation 26)

In the equation above, $V^{(nm)}$ can represent the velocity of the n-the satellite as determined from the ephemeris of the m-th signal, $u_{knm}$ can represent the unit vector from the position solution to the position of the n-th satellite given by equation 17 above, $\dot{b}^*$ can represent the true velocity bias due to the receiver clock drift, and $\bar{\epsilon}_{nm}$ can represent the pseudorange measurement error for (SV, signal)=(n, m), which can be assumed to zero mean Gaussian. Additionally, it can be assumed that the pseudorange rate measurement is uncorrelated with the pseudorange measurement. Since the geometry matrix $G_k$ was computed at equation 12, the expression for the velocity and clock drift for the seed can be written according to equation 27 below:

$$G_k \begin{bmatrix} v_k \\ \dot{b}_k \end{bmatrix} = \dot{\rho}$$

(Equation 27)

The i-th element of the pseudorange rate can be given by equation 28 below:

$$(\dot{\rho})_i = \dot{p}_{n_i m_i} - u_{k n_i m_i} v^{(n_i m_i)} \quad \text{(Equation 28)}$$

In light of the above equation, the velocity, clock drift solution error covariance matrix for $(v_k, \dot{b}_k)$ can thus be given by equation 29 below:

$$\overline{P}_k = (G_k^T G_k)^{-1} G_k^T \overline{W}_k G_k (G_k^T G_k)^{-1} \quad \text{(Equation 29)}$$

In equation 29 above $\overline{W}_k$ can represent the pseudorange measurement covariance matrix. Similar to pseudorange, the pseudorange rate can be predicted as well as measured (from the ephemeris of the satellite transmitting a signal), thus providing additional evidence to determine whether a given set of signals (i.e., an atom or cluster as explained further below) is a consistent set that can be transmitted to a PVT processor. In one or more examples, for the k-th seed, the predicted pseudorange rate prediction and the pseudorange rate residual for signals from a satellite not represented in a seed indexed as (SV, signal)=(n,m) can be expressed using equations 30 and 31 below:

$$\hat{\dot{\rho}}_{knm} = u_{knm}^T (v^{(nm)} - v_k) + \dot{b}_k \quad \text{(Equation 30)}$$

$$\overline{d}_{knm} = \dot{p}_{nm} - \hat{\dot{\rho}}_{knm} \quad \text{(Equation 31)}$$

In one or more examples, and for the purpose of determining the variance of the pseudorange rate residues, equation 31 above can be rewritten as a zero mean Gaussian random variable using equation 32 below:

$$\overline{d}_{knm} = \overline{\epsilon}_{nm} - g_{knm} (G_k^T G_k)^{-1} G_k^T \overline{\epsilon}_k \quad \text{(Equation 32)}$$

In equation 32 above, $\overline{\epsilon}_k$ can represent the pseudorange rate measurement error vector for the seed. The pseudorange rate residual variance can be given be equation 33 below:

$$\overline{\sigma}_{knm}^2 \triangleq \mathrm{var}(\overline{d}_{knm}) = \overline{\sigma}_{nm}^2 + g_{knm} \overline{P}_k g_{knm}^T \quad \text{(Equation 33)}$$

In equation 33 above, the geometry vector $g_{knm}$ can be computed using equation 18 above. In one or more examples, since $d_{knm}$ and $\overline{d}_{knm}$ are uncorrelated, the join covariance matrix for the vector $d_{knm} = [d_{knm} \; \overline{d}_{knm}]^T$ can be given by the diagonal covariance matrix expressed below in equation 34:

$$\Lambda_{knm} \triangleq \begin{bmatrix} \sigma_{knm}^2 & 0 \\ 0 & \overline{\sigma}_{knm}^2 \end{bmatrix} \quad \text{(Equation 34)}$$

As described above, both the pseudorange residual and the pseudorange rate residual can serve as evidence to test the hypothesis that a given set of signals are consistent (i.e., true). Thus returning to the example of FIG. 4, at step 406, the position of the receiver, the clock bias of the receiver, the velocity of the receiver, and the clock drift of the receiver can be estimated based on a given seed according to the process described above.

Once the above estimates for a given seed are calculated, the process 400 can move to step 408 wherein a plurality of atoms are generated based on the seeds generated at step 404. The pseudorange and pseudorange estimates generated with the seeds are based on solving a system of equations using the signals within the seeds, the solution yielded by the seed will be exact and thus they may not be used by themselves to determine that a set of signals forming the seed are consistent. Thus, in order to be tested, the estimates generated from the seed at step 406 can be used to generate evidence to determine whether a given signal is consistent. The evidence, can be generated by adding an additional signal (from a source that is not part of the seed) to the seed referred to as an atom in order to generate the residuals (described above) that can be used to determine if a given set of signals are consistent.

In one or more examples, a plurality of atoms can be generated for each seed generated at step 404. In one or more examples, an atom can be generated by adding a signal indexed by (SV, signal)=(n,m), for satellites not represented in the seek k. In one or more example, a singe atom can be generated by using a given seed and adding a signal from a satellite not represented in the seed. Thus, in one or more examples, an atom can be generated from a given seed for each and every signal received by the receiver from a satellite that is not part of the seed and atoms as described above can be generated for each and every seed generated at step 404.

Once the atoms have been generated at step 408, the process 400 can move to step 410 wherein for a given seed, the atoms generated for that seed at step 408 can be sorted based on the posterior LPR L $(a_{knm}|d_{knm})$. The posterior LPR can be calculated using a process that involves calculating pseudorange and pseudorange rate residuals described above using a process described below with respect to FIG. 5.

The FIG. 5 illustrates an exemplary process for sorting atoms within a process for generating a consistent signal set for a PVT processor according to examples of the disclosure. In one or more examples, the process 500 of FIG. 5 can be used to sort atoms for a given seed based on their posterior LPR which can represent the probability that a given atom is a true set (i.e., all the signals in the atom are true signals and thus the atom is a consistent set) based on the observed residuals for both pseudorange and pseudorange rate.

In one or more examples, the process 500 can begin at step 502 wherein a predicted pseudorange is calculated based on the predicted three-dimensional (X,Y,Z) position of the receiver calculated using the seed of the atom and the predicted true receiver clock offset also calculated using the seed of the atom. Thus, at step 502, the unit vector $u_{knm}$ can be calculated according to equation 17 above. Once the unit vector is calculated, and at step 502, the geometry vector $g_{knm}$ can be calculated using equation 18 above. Using both the calculated unit vector and the calculated geometry vector, the predicted pseudorange of the signal added to the seed to make the atom $\overline{p}_{knm}$ can be calculated by using the solution $(x_k, b_k)$ in the pseudorange equation 15 described above.

In one or more examples, once the predicted pseudorange is calculated at step 502, the process 500 can move to step 504, wherein the calculated pseudorange residual can be calculated by calculating the difference of the measured pseudorange (based off the ephemeris received from the satellite that transmits the non-seed signal of the atom) and the predicted pseudorange calculated at step 502. In addition to calculating the residual, at step 504, the geometry vector and the seed's position and clock bias solution covariance matrix $P_k$ can be used to calculate the variance of $d_{knm}$ ($\sigma_{knm}^2$) using equation 20 above.

Once the pseudorange residual for the atom is calculated at step 504, the process 500 can move to step 506, wherein the predicted pseudorange rate can be calculated for the non-seed signal of the atom. In one or more examples, at step 506, the predicted pseudorange rate $\hat{\dot{\rho}}_{knm}$ can be obtained by using the solution $(v_k, \dot{b}_k)$ in the pseudorange rate equation 30 above. In one or more examples, once the pseudorange rate prediction is generated at step 506, the process 500 can move to step 508 wherein the pseudorange rate residual is calculated. Similar to the pseudorange rate calculated above with respect to step 504, the pseudorange rate residual can be calculated by taking the difference between the predicted pseudorange rate and the measured pseudorange rate (as generated using the ephemeris of the non-seed satellite signal of the atom). Additionally at step 505B, the geometry vector and the seed's velocity and clock drift covariance matrix $\bar{P}_k$ can be used to calculate the variance ($\bar{\sigma}_{knm}^2$) of the pseudorange rate residual.

The pseudorange rate residual calculate at step 504 and pseudorange rate residual calculated at step 508 can now serve as evidence to ascertain the likelihood that the atom is a consistent set, and can be used to determine the posterior LPR $L(a_{knm}|d_{knm})$ for the atom.

In one or more examples, and using equation 34 above, the log-likelihood function for the two observations (pseudorange residual and pseudorange rate residual) can be expressed using equation 35 below:

$$\log P(d_{knm}|a_{knm}) = -\tfrac{1}{2} d_{knm}^T \nabla_{knm}^{-1} d_{knm} - \tfrac{1}{2}\log \det (\nabla_{knm}) - \log 2\pi \quad \text{(Equation 35)}$$

In one or more examples, equation 35 above can assume that the log-likelihood function for $a_{knm}=0$ has a zero quadratic term and the same covariance. The LLR can remove the last two terms to yield the quadratic form expressed in equation 36 below:

$$L(d_{knm}|a_{knm}) = -\tfrac{1}{2} d_{knm}^T \nabla_{knm}^{-1} d_{knm} \quad \text{(Equation 36)}$$

As described above the posterior LPR can be given by equation 37 below:

$$L(a_{knm}|d_{knm}) = L(d_{knm}|a_{knm}) + L(a_{knm}) \quad \text{(Equation 37)}$$

At step 510, the LPR for each atom (pertaining to a given seed) can be calculated as described above. In one or more example, the LPR for an atom can give a relative indication about the likelihood that the signals in the atom represent a true set. In other words, an atom with a higher LPR (in comparison with another) will more likely be a consistent set than the lower LPR atom. Thus, once an LPR has been calculated for each atom of a seed at step 510, the process 500 can move to step 512 wherein the atoms are sorted by LPR in order from greatest to least. In this way, the atoms are sorted by their likelihood that the entire atom (i.e., the four seed signals and the one non-seed signals) are from true sources and thus by their likelihood that the atom forms a consistent set that can be transmitted to a PVT processor and provide an accurate result of the receiver's position and velocity.

Returning to the example of FIG. 4, once the atoms have been sorted by posterior LPRs from most probable to least probable at step 410 (in one or more examples sorted according to the process 500 of FIG. 5), the process 400 can move to step 410 wherein a cluster is built using the atoms created and sorted according to steps 408 and 410 as described above. As described above a cluster is a set of at least five signals that is a candidate to be considered a consistent set. Thus, in one or more examples, each atom generated and sorted as described above can be considered the smallest cluster, and thus if the atoms are satisfactory, the process can simply transmit each atom with a satisfactory posterior LPR to a PVT processor for further processing. However, there is likely to be a benefit in PVT accuracy to be gained using a larger set of true signals. As described above, the more true signals from distinct satellites transmitted as part of a consistent set to a PVT processor, the higher the accuracy in the PVT processor's estimation of position, clock bias, velocity and clock drift. Thus, while sending certain atoms (with satisfactory posterior LPRs of being true) may allow for the PVT processor to calculate the position of a receiver with a high degree of accuracy, adding additional signals to the atom may lead to an even more accurate result. However, adding an additional signal to an atom so as to enlarge a cluster will necessarily cause the resulting posterior LPR of the enlarged cluster to be less that that of the existing cluster as long as the added signal is not certain to be true. As described above, the reason it may be desirable to add additional true signals to a cluster is to improve the solution accuracy and reduce the PVT solution error covariance. Thus, there is a tradeoff between the improved covariance of the englarged cluster of true signals verses the biased error that could result should that signal to be false. Thus, in order to quantify the tradeoff and make an optimal decision what may be needed is (1) a cost function that can determine the relative cost of the PVT solution covariance for a given cluster; and (2) the posterior probabilities of an existing cluster (before adding an additional signal) and the enlarged cluster (after adding the additional signal) after calculating an LLR for the enlarged cluster. From these two items the process can compute the expected cost for both the existing cluster and the enlarged cluster and choose the cluster with the least cost.

In order to describe the generation of clusters and to describe the cost functions associated with generating clusters, a few notational changes can be introduced. In one or more examples, x* can be denoted as the four-dimensional true position and clock bias, and v as the four-dimensional true velocity and clock drift. The index j can be used to reference how many signals from different satellites (SVs) have been incorporated into the clusters. For the seed, the following can be denoted: the indicator s, four dimensional position and clock bias solution vector $x_4$, velocity and clock drift solution vector $\dot{x}_4$, geometry matrix $G_4$, the pseudorange diagonal measurement covariance matrix $W_4$, the pseudorange rate diagonal measurement covariance matrix $\overline{W}_4$, the position/clock bias solution covariance matrix $P_4$, and the velocity/clock drift solution covariance matrix $\overline{P}_4$.

For additional candidate signals to be added to a seed/atom, the following notations can be denoted: the truth indicator for the j-th signal $S_j$, the pseudorange measurement $\rho_j$, pseudorange rate measurement $\overline{\rho}_j$, pseudorange measurement variance $\sigma_j^2$, pseudorange rate measurement variance $\overline{\sigma}_j^2$, and geometry vector formed from the seed $g_j$.

For a cluster size j, the following can be defined: the truth indicator for the cluster $c_j$, the geometry matrix $G_1$, the pseudorange diagonal covariance matrix $W_j$, the pseudorange rate diagonal measurement covariance matrix $\overline{W}_j$, the position and clock bias solution covariance matrix $P_j$, and the vector of accumulated observables (i.e., the residuals) from predicting signals from the solution of a cluster one signal smaller $d_{5;j}$.

As described above, in order to evaluate whether adding a signal to a cluster is worth it (i.e., the benefit of adding the signal exceeds the risk that the additional signal is false) a cost function can be developed to determine whether to add the signal to a cluster. Suppose there is a cluster containing j signals, and adding a j+1 signal for an SV that is not one of the j already represented in the cluster is being considered. Equation 38 below can represent positions of the receiver in terms of the two different clusters:

$$x_{j+1} - x^* = x_{j+1} - x_j + x_j - x^* \quad \text{(Equation 38)}$$

If the j+1-st signal is true, denoted as $c_{j+1}=1$, then $x_{j+1}-x^*$ can be assumed to be zero-mean Gaussian with covariance matrix $P_{j+1}$. However, if $c_{j+1}=0$ then $x_{j+1}-x_j$ can be treated as a bias, and the covariance matrix is that of $x_j-x^*$ denoted as $P_j$. $x_j-x_{j-1}$ can also have been retained. In one or more examples, $d_{j+1}$ can be denoted as the vector containing the pseudorange and pseudorange rate residuals when using the $x_j$ in the pseudorange and pseudorange rate equations for the j+1-st signal, and $d_{5:j}$ as the vector of similarly computed residuals for all smaller clusters contained in the enlarged cluster, recognizing that the smallest cluster is the atom of size 5. The root-mean-square (RMS) solution error for the true signals can also be known as the geometric dilution of precision (GDOP) The two cost functions (one for the original cluster and another for the cluster with an additional signal added) are the expected RMS solution error for each cluster using the observables up to and including $d_{j+1}$. Thus equation 39 can represent the cost function of the original cluster, and equation 40 below can represent the cost function of the enlarged cluster.

$$C_j = \sqrt{\mathrm{trace}(P_j)P(c_j = 1 \mid d_{5:j+1}) + \|x_j - x_{j-1}\|^2 + \mathrm{trace}(P_{j-1})P(c_j = 0 \mid d_{5:j+1})} \quad \text{(Equation 39)}$$

$$C_{j+1} = \sqrt{\mathrm{trace}(P_{j+1})P(c_{j+1} = 1 \mid d_{5:j+1}) + \|x_{j+1} - x_j\|^2 + \mathrm{trace}(P_j)P(c_{j+1} = 0 \mid d_{5:j+1})} \quad \text{(Equation 40)}$$

The above cost functions can be used (as described in further detail below) to generate and assess clusters. The above cost functions are meant as exemplary only, and should not be seen as limiting to the disclosure. In one or more examples, other costs functions that assess the risk of adding a signal to an existing atom/cluster can be used to build up clusters. As described above, the accuracy of a particular PVT calculation can be increased by adding more signals to the PVT processor, however, adding more signals to a cluster can also increase the likelihood that a "false" signal is being sent to the PVT processor. Thus, in one or more examples, one or more clusters are built using the cost functions described above with respect to equations 39 and 40 or any other cost function that can help to determine if the benefit of adding an additional signal to the cluster outweighs the risk of adding an "false" signal to the cluster.

FIG. 6 illustrates an exemplary process for building a cluster within a process for generating a consistent signal set for a PVT processor according to examples of the disclosure. In one or more examples, the process 600 of FIG. 6 can begin at step 602 wherein an atom (that is disjoint from any previously accepted clusters insofar as it does not contain signals common to the previous clusters is selected). Once an atom is selected at step 602, the process 600 can move to step 604 wherein a potential signal to be added to an existing atom (i.e., a cluster of 5 signals) or an existing cluster can be received. In one or more examples, the signal received at step 604 can have been received as part of the signals received at step 302 of process 300. In one or more examples, once the signal to be considered for addition to the existing cluster/atom is received at step 604, the process 600 can move to step 606 wherein the cost functions for both the existing cluster and the cluster with the additional signal are calculated. As described above, in one or more examples, the cost functions can be calculated using equations 39 and 40 described above, or can be calculated using any other cost function that can assess the cost (in terms of added probability of a false signal) of adding a signal to an existing cluster.

In one or more examples, once the cost functions have been calculated at step 606, the process 600 can move to step 608 wherein the cost functions for the existing cluster/atom and the potential cluster (with the new signal added) are compared to determine if the cost (i.e., the cost function) of adding the signal is greater than the cost of the existing cluster. In one or more examples, if the cost is found to be greater, then the new signal is rejected from being added to the cluster and the process 600 moves to step 610 wherein the cluster is sent to the PVT processor (without the signal received at step 602) and a determination is made as to whether any more atoms (that are disjointed from the previously accepted clusters) are still left to be considered. If it is determined that all the atoms have been considered, then the process 600 moves to step 612 wherein the process 600 is terminated. If however, it is determined at step 610 that there are still atoms left to be considered, then in one or more examples, the process 600 can revert back to 602 wherein a new atom is selected.

In one or more examples, if at step 608, it is determined that the cost of the new cluster is not greater than the cost of the existing cluster, then the process 600 can move to step 614 wherein the signal received at step 604 can be added to the existing cluster. Once the signal has been added to the existing cluster at step 614, the process 600 can move to step 616 wherein a determination is made as to whether there are any more signals are available to be analyzed for addition to the cluster. If at step 616 it is determined that there are more signals to be considered, then the process 600 can revert back to step 604 wherein an additional signal can be considered for inclusion into the cluster. If however at step 616 it is determined that no further signal are available, the then the process 600 can move to step 618 wherein the process is terminated.

Figure 7:
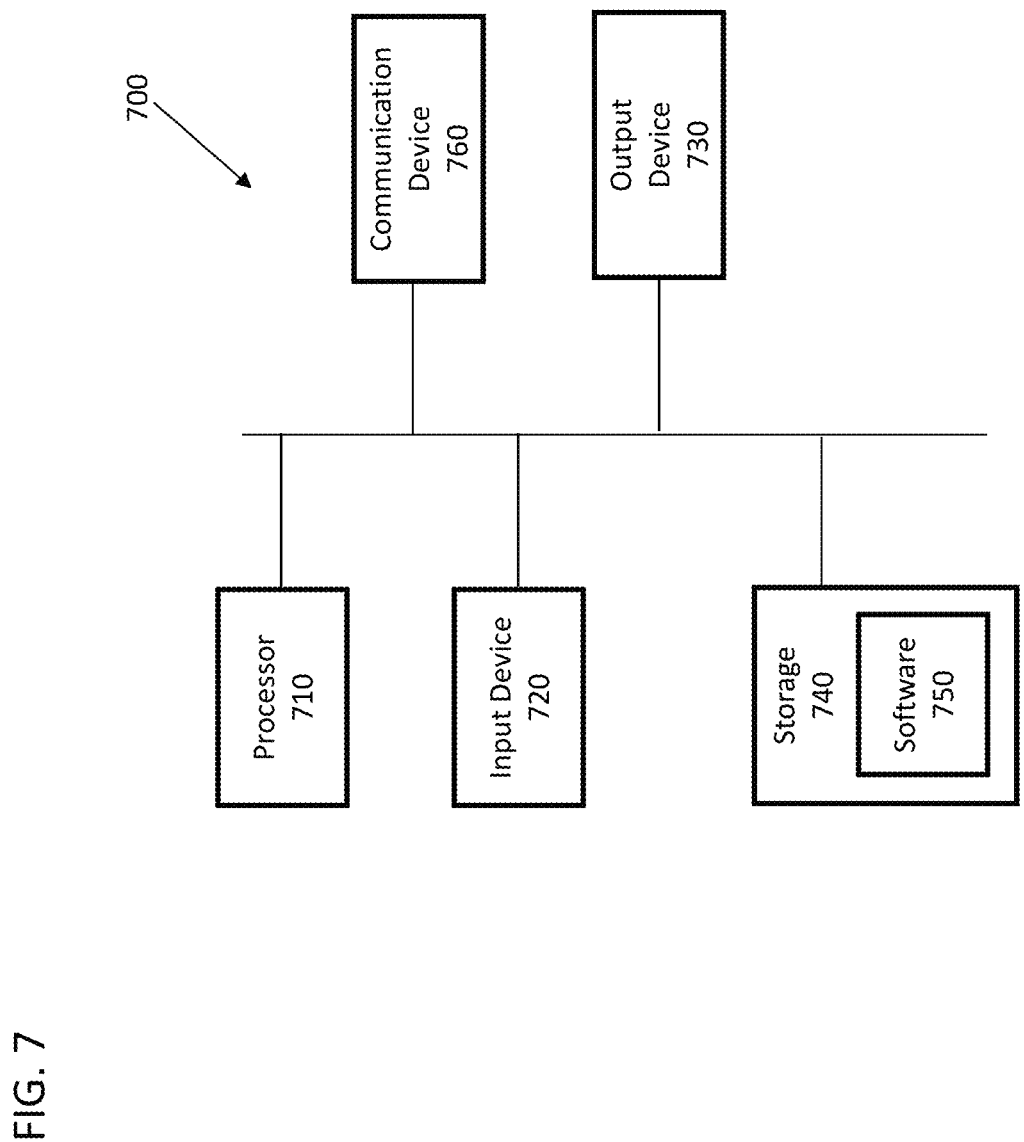
FIG. 7 illustrates an examplary of a computing device in accordance with one or more examples of the disclosure.

FIG. 7 illustrates an exemplary computing device in accordance with one or more examples of the disclosure embodiment. Device 700 can be a host computer connected to a network. Device 700 can be a client computer or a server. As shown in FIG. 7, device 700 can be any suitable type of microprocessor-based device, such as a personal computer, workstation, server, or handheld computing device (portable electronic device) such as a phone or tablet. The device can include, for example, one or more of processor 710, input device 720, output device 730, storage 740, and communication device 760. Input device 720 and output device 730 can generally correspond to those described above and can either be connectable or integrated with the computer.

Input device 720 can be any suitable device that provides input, such as a touch screen, keyboard or keypad, mouse, or voice-recognition device. Output device 730 can be any suitable device that provides output, such as a touch screen, haptics device, or speaker.

Storage 740 can be any suitable device that provides storage, such as an electrical, magnetic, or optical memory, including a RAM, cache, hard drive, or removable storage disk. Communication device 760 can include any suitable device capable of transmitting and receiving signals over a network, such as a network interface chip or device. The components of the computer can be connected in any suitable manner, such as via a physical bus or wirelessly.

Software 750, which can be stored in storage 740 and executed by processor 710, can include, for example, the programming that embodies the functionality of the present disclosure (e.g., as embodied in the devices as described above).

Software 750 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 740, that can contain or store programming for use by or in connection with an instruction execution system, apparatus, or device.

Software 750 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 700 can implement any operating system suitable for operating on the network. Software 750 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

In one or more examples, a method for selecting a set of satellite signals from a plurality of received satellite signals for processing by a position, velocity, time (PVT) processor to determine the location of a receiver of the plurality of satellite signals comprises: selecting a pre-determined number of satellite signals from the plurality of received satellite signals to generate a first set of satellite signals, determining an estimated position and velocity of the receiver based on the generated first set of satellite signals, generating a plurality of second sets of satellite signals, wherein each second set of the plurality of second sets is generated by adding an additional signal from the plurality of satellite signals not already belonging to the first set of satellite signal to the first set of satellite signals, for each generated second set of satellite signals, determining a likelihood that the satellite signals forming the second set of a satellite signals are legitimate satellite signals, selecting a second set of satellite signals of the plurality of second sets of satellite signals based on the determined likelihood for each generated second set of satellite signals, for the selected second set of satellite signals of the plurality of second sets of satellite signals: determining a cost metric associated with the selected second set of satellite signals, adding an additional signal to the selected second set of satellite signals to form a third set of satellite signals, wherein the additional signal is selected from the received satellite signals that are not part of the selected second set of satellite signals, determining a cost metric associated with the third set of satellite signals, and if the cost metric associated with the third set of satellite signals is greater than the cost metric associated with the selected second set of signals: transmitting the selected second set of satellite signals to the PVT processor.

Additionally or alternatively, selecting a second set of satellite signals of the plurality of satellite signals comprises: sorting the plurality of second sets of satellite signals based on the determined likelihood that the satellite signals forming the second set of a satellite signals are legitimate satellite signals, and selecting a second set of satellite signals of the plurality of second sets of satellite signals with the highest determined likelihood that the satellite signals forming the second set of a satellite signals are legitimate satellite signals.

Additionally or alternatively, determining a likelihood that the satellite signals forming the second set of a satellite signals are legitimate satellite signals comprises: extracting position and velocity information from the additional signals of the plurality of satellite signals used to form the second set of satellite signals, estimating the range and the rate of change of range of the additional signal from the extracted position and velocity information from the additional signals of the plurality of satellite signals used to form the second set of satellite signals, determining estimated position and velocity of the receiver based on the generated first set of satellite signals, comparing the estimated range and the rate of change of range of the additional signal with the determined estimated position and velocity of the receiver, and determining the likelihood that the satellite signals forming the second set of a satellite signals are legitimate satellite signals based on the comparison between the estimated range and the rate of change of range of the additional signal with the determined estimated position and velocity of the receiver.

Additionally or alternatively, the cost metric associated with the selected second set of satellite signals is based on the likelihood that the satellite signals forming the second set of a satellite signals are legitimate satellite signals.

Additionally or alternatively, the cost metric associated with the third set of satellite signals are based on a likelihood that the satellite signals forming the third set of a satellite signals are legitimate satellite signals.

Additionally or alternatively, the method comprises: if the cost metric associated with the third set of satellite signals is less than the cost metric associated with the selected second set of signals: adding an additional signal to the third set of satellite signals to form a fourth set of satellite signals, wherein the additional signal is selected from the received satellite signals that are not part of the third set of satellite signals.

Additionally or alternatively, the method comprises: determining a cost metric associated with the fourth set of satellite signals; and if the cost metric associated with the fourth set of satellite signals is greater than the cost metric associated with the third set of signals: transmitting the third set of satellite signals to the PVT processor.

In one or more examples, a system for selecting a set of satellite signals from a plurality of received satellite signals for processing by a position, velocity, time (PVT) processor to determine the location of a receiver of the plurality of satellite signals comprises: a memory, one or more processors wherein the memory stores one or more programs that when executed by the one or more processors, cause the one or more processors to: select a pre-determined number of satellite signals from the plurality of received satellite signals to generate a first set of satellite signals; determine an estimated position and velocity of the receiver based on the generated first set of satellite signals, generate a plurality of second sets of satellite signals, wherein each second set of the plurality of second sets is generated by adding an additional signal from the plurality of satellite signals not already belonging to the first set of satellite signal to the first set of satellite signals, for each generated second set of satellite signals, determine a likelihood that the satellite signals forming the second set of a satellite signals are legitimate satellite signals, select a second set of satellite signals of the plurality of second sets of satellite signals based on the determined likelihood for each generated second set of satellite signals, for the selected second set of satellite signals of the plurality of second sets of satellite signals: determine a cost metric associated with the selected second set of satellite signals, add an additional signal to the selected second set of satellite signals to form a third set of satellite signals, wherein the additional signal is selected from the received satellite signals that are not part of the selected second set of satellite signals, determine a cost metric associated with the third set of satellite signals, and if the cost metric associated with the third set of satellite signals is greater than the cost metric associated with the selected second set of signals: transmit the selected second set of satellite signals to the PVT processor.

Additionally or alternatively, selecting a second set of satellite signals of the plurality of satellite signals comprises: sorting the plurality of second sets of satellite signals based on the determined likelihood that the satellite signals forming the second set of a satellite signals are legitimate satellite signals, and selecting a second set of satellite signals of the plurality of second sets of satellite signals with the highest determined likelihood that the satellite signals forming the second set of a satellite signals are legitimate satellite signals.

Additionally or alternatively, determining a likelihood that the satellite signals forming the second set of a satellite signals are legitimate satellite signals comprises: extracting position and velocity information from the additional signals of the plurality of satellite signals used to form the second set of satellite signals, estimating the range and the rate of change of range of the additional signal from the extracted position and velocity information from the additional signals of the plurality of satellite signals used to form the second set of satellite signals, determining estimated position and velocity of the receiver based on the generated first set of satellite signals, comparing the estimated range and the rate of change of range of the additional signal with the determined estimated position and velocity of the receiver, and determining the likelihood that the satellite signals forming the second set of a satellite signals are legitimate satellite signals based on the comparison between the estimated range and the rate of change of range of the additional signal with the determined estimated position and velocity of the receiver.

Additionally or alternatively, the cost metric associated with the selected second set of satellite signals is based on the likelihood that the satellite signals forming the second set of a satellite signals are legitimate satellite signals.

Additionally or alternatively, the cost metric associated with the third set of satellite signals are based on a likelihood that the satellite signals forming the third set of a satellite signals are legitimate satellite signals.

Additionally or alternatively, the processor is further caused to: if the cost metric associated with the third set of satellite signals is less than the cost metric associated with the selected second set of signals: adding an additional signal to the third set of satellite signals to form a fourth set of satellite signals, wherein the additional signal is selected from the received satellite signals that are not part of the third set of satellite signals.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

This application discloses several numerical ranges in the text and figures. The numerical ranges disclosed inherently support any range or value within the disclosed numerical ranges, including the endpoints, even though a precise range limitation is not stated verbatim in the specification, because this disclosure can be practiced throughout the disclosed numerical ranges.

The above description is presented to enable a person skilled in the art to make and use the disclosure, and it is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown but is to be accorded the widest scope consistent with the principles and features disclosed herein. Finally, the entire disclosure of the patents and publications referred in this application are hereby incorporated herein by reference.

What is claimed is:

1. A method for selecting a set of satellite signals from a plurality of received satellite signals for processing by a position, velocity, time (PVT) processor to determine the location of a receiver of the plurality of satellite signals, the method comprising:

selecting a pre-determined number of satellite signals from the plurality of received satellite signals to generate a first set of satellite signals;

determining an estimated position and velocity of the receiver based on the generated first set of satellite signals;

generating a plurality of second sets of satellite signals, wherein each second set of the plurality of second sets is generated by adding an additional signal from the plurality of satellite signals not already belonging to the first set of satellite signal to the first set of satellite signals;

for each generated second set of satellite signals, determining a likelihood that the satellite signals forming the second set of a satellite signals are legitimate satellite signals;
selecting a second set of satellite signals of the plurality of second sets of satellite signals based on the determined likelihood for each generated second set of satellite signals;
for the selected second set of satellite signals of the plurality of second sets of satellite signals:
determining a cost metric associated with the selected second set of satellite signals;
adding an additional signal to the selected second set of satellite signals to form a third set of satellite signals, wherein the additional signal is selected from the received satellite signals that are not part of the selected second set of satellite signals;
determining a cost metric associated with the third set of satellite signals, wherein the cost metric associated with the third set of satellite signals is based on a benefit of adding the additional signal to the selected second set of satellite signals and a risk that the additional signal is a false signal; and
if the cost metric associated with the third set of satellite signals is greater than the cost metric associated with the selected second set of signals:
transmitting the selected second set of satellite signals to the PVT processor.

2. The method of claim 1, wherein selecting a second set of satellite signals of the plurality of satellite signals comprises:
sorting the plurality of second sets of satellite signals based on the determined likelihood that the satellite signals forming the second set of a satellite signals are legitimate satellite signals; and
selecting a second set of satellite signals of the plurality of second sets of satellite signals with the highest determined likelihood that the satellite signals forming the second set of a satellite signals are legitimate satellite signals.

3. The method of claim 1, wherein determining a likelihood that the satellite signals forming the second set of a satellite signals are legitimate satellite signals comprises:
extracting position and velocity information from the additional signals of the plurality of satellite signals used to form the second set of satellite signals;
estimating the range and the rate of change of range of the additional signal from the extracted position and velocity information from the additional signals of the plurality of satellite signals used to form the second set of satellite signals;
determining estimated position and velocity of the receiver based on the generated first set of satellite signals;
comparing the estimated range and the rate of change of range of the additional signal with the determined estimated position and velocity of the receiver; and
determining the likelihood that the satellite signals forming the second set of a satellite signals are legitimate satellite signals based on the comparison between the estimated range and the rate of change of range of the additional signal with the determined estimated position and velocity of the receiver.

4. The method of claim 1, wherein the cost metric associated with the selected second set of satellite signals is based on the likelihood that the satellite signals forming the second set of a satellite signals are legitimate satellite signals.

5. The method of claim 4, wherein the cost metric associated with the third set of satellite signals are based on a likelihood that the satellite signals forming the third set of a satellite signals are legitimate satellite signals.

6. The method of claim 1, wherein the method comprises:
if the cost metric associated with the third set of satellite signals is less than the cost metric associated with the selected second set of signals:
adding an additional signal to the third set of satellite signals to form a fourth set of satellite signals, wherein the additional signal is selected from the received satellite signals that are not part of the third set of satellite signals.

7. The method of claim 6, wherein the method comprises:
determining a cost metric associated with the fourth set of satellite signals; and
if the cost metric associated with the fourth set of satellite signals is greater than the cost metric associated with the third set of signals:
transmitting the third set of satellite signals to the PVT processor.

8. A system for selecting a set of satellite signals from a plurality of received satellite signals for processing by a position, velocity, time (PVT) processor to determine the location of a receiver of the plurality of satellite signals, the system comprising:
a memory;
one or more processors;
wherein the memory stores one or more programs that when executed by the one or more processors, cause the one or more processors to:
select a pre-determined number of satellite signals from the plurality of received satellite signals to generate a first set of satellite signals;
determine an estimated position and velocity of the receiver based on the generated first set of satellite signals;
generate a plurality of second sets of satellite signals, wherein each second set of the plurality of second sets is generated by adding an additional signal from the plurality of satellite signals not already belonging to the first set of satellite signal to the first set of satellite signals;
for each generated second set of satellite signals, determine a likelihood that the satellite signals forming the second set of a satellite signals are legitimate satellite signals;
select a second set of satellite signals of the plurality of second sets of satellite signals based on the determined likelihood for each generated second set of satellite signals;
for the selected second set of satellite signals of the plurality of second sets of satellite signals:
determine a cost metric associated with the selected second set of satellite signals;
add an additional signal to the selected second set of satellite signals to form a third set of satellite signals, wherein the additional signal is selected from the received satellite signals that are not part of the selected second set of satellite signals;
determine a cost metric associated with the third set of satellite signals, wherein the cost metric associated with the third set of satellite signals is based on a benefit of adding the additional signal to the selected second set of satellite signals and a risk that the additional signal is a false signal; and if the cost metric associated with the third set of satellite signals is greater than the cost metric associated with the selected second set of signals:
transmit the selected second set of satellite signals to the PVT processor.

9. The system of claim 8, wherein selecting a second set of satellite signals of the plurality of satellite signals comprises:
sorting the plurality of second sets of satellite signals based on the determined likelihood that the satellite signals forming the second set of a satellite signals are legitimate satellite signals; and
selecting a second set of satellite signals of the plurality of second sets of satellite signals with the highest determined likelihood that the satellite signals forming the second set of a satellite signals are legitimate satellite signals.

10. The system of claim 8, wherein determining a likelihood that the satellite signals forming the second set of a satellite signals are legitimate satellite signals comprises:
extracting position and velocity information from the additional signals of the plurality of satellite signals used to form the second set of satellite signals;
estimating the range and the rate of change of range of the additional signal from the extracted position and velocity information from the additional signals of the plurality of satellite signals used to form the second set of satellite signals;
determining estimated position and velocity of the receiver based on the generated first set of satellite signals;
comparing the estimated range and the rate of change of range of the additional signal with the determined estimated position and velocity of the receiver; and
determining the likelihood that the satellite signals forming the second set of a satellite signals are legitimate satellite signals based on the comparison between the estimated range and the rate of change of range of the additional signal with the determined estimated position and velocity of the receiver.

11. The system of claim 8, wherein the cost metric associated with the selected second set of satellite signals is based on the likelihood that the satellite signals forming the second set of a satellite signals are legitimate satellite signals.

12. The system of claim 11, wherein the cost metric associated with the third set of satellite signals are based on a likelihood that the satellite signals forming the third set of a satellite signals are legitimate satellite signals.

13. The system of claim 8, wherein the one or more processors are caused to:
if the cost metric associated with the third set of satellite signals is less than the cost metric associated with the selected second set of signals:
add an additional signal to the third set of satellite signals to form a fourth set of satellite signals, wherein the additional signal is selected from the received satellite signals that are not part of the third set of satellite signals.

14. The system of claim 13, wherein the one or more processors are caused to:
determine a cost metric associated with the fourth set of satellite signals; and if the cost metric associated with the fourth set of satellite signals is greater than the cost metric associated with the third set of signals:
transmit the third set of satellite signals to the PVT processor.

15. A non-transitory computer readable storage medium storing one or more programs for selecting a set of satellite signals from a plurality of received satellite signals for processing by a position, velocity, time (PVT) processor to determine the location of a receiver of the plurality of satellite signals, the one or more programs comprising instructions, which, when executed by an electronic device with a display and a user input interface, cause the device to:
select a pre-determined number of satellite signals from the plurality of received satellite signals to generate a first set of satellite signals;
determine an estimated position and velocity of the receiver based on the generated first set of satellite signals;
generate a plurality of second sets of satellite signals, wherein each second set of the plurality of second sets is generated by adding an additional signal from the plurality of satellite signals not already belonging to the first set of satellite signal to the first set of satellite signals;
for each generated second set of satellite signals, determine a likelihood that the satellite signals forming the second set of a satellite signals are legitimate satellite signals;
select a second set of satellite signals of the plurality of second sets of satellite signals based on the determined likelihood for each generated second set of satellite signals;
for the selected second set of satellite signals of the plurality of second sets of satellite signals:
determine a cost metric associated with the selected second set of satellite signals;
add an additional signal to the selected second set of satellite signals to form a third set of satellite signals, wherein the additional signal is selected from the received satellite signals that are not part of the selected second set of satellite signals;
determine a cost metric associated with the third set of satellite signals, wherein the cost metric associated with the third set of satellite signals is based on a benefit of adding the additional signal to the selected second set of satellite signals and a risk that the additional signal is a false signal; and
if the cost metric associated with the third set of satellite signals is greater than the cost metric associated with the selected second set of signals:
transmit the selected second set of satellite signals to the PVT processor.

16. The non-transitory computer readable storage medium of claim 15, wherein selecting a second set of satellite signals of the plurality of satellite signals comprises:
sorting the plurality of second sets of satellite signals based on the determined likelihood that the satellite signals forming the second set of a satellite signals are legitimate satellite signals; and
selecting a second set of satellite signals of the plurality of second sets of satellite signals with the highest determined likelihood that the satellite signals forming the second set of a satellite signals are legitimate satellite signals.

17. The non-transitory computer readable storage medium of claim 15, wherein determining a likelihood that the satellite signals forming the second set of a satellite signals are legitimate satellite signals comprises:
- extracting position and velocity information from the additional signals of the plurality of satellite signals used to form the second set of satellite signals;
- estimating the range and the rate of change of range of the additional signal from the extracted position and velocity information from the additional signals of the plurality of satellite signals used to form the second set of satellite signals;
- determining estimated position and velocity of the receiver based on the generated first set of satellite signals;
- comparing the estimated range and the rate of change of range of the additional signal with the determined estimated position and velocity of the receiver; and
- determining the likelihood that the satellite signals forming the second set of a satellite signals are legitimate satellite signals based on the comparison between the estimated range and the rate of change of range of the additional signal with the determined estimated position and velocity of the receiver.

18. The non-transitory computer readable storage medium of claim 15, wherein the cost metric associated with the selected second set of satellite signals is based on the likelihood that the satellite signals forming the second set of a satellite signals are legitimate satellite signals.

19. The non-transitory computer readable storage medium of claim 18, wherein the cost metric associated with the third set of satellite signals are based on a likelihood that the satellite signals forming the third set of a satellite signals are legitimate satellite signals.

20. The non-transitory computer readable storage medium of claim 15, wherein the device is caused to:
- if the cost metric associated with the third set of satellite signals is less than the cost metric associated with the selected second set of signals:
  - add an additional signal to the third set of satellite signals to form a fourth set of satellite signals, wherein the additional signal is selected from the received satellite signals that are not part of the third set of satellite signals.

21. The non-transitory computer readable storage medium of claim 20, wherein the device is caused to:
- determine a cost metric associated with the fourth set of satellite signals; and
- if the cost metric associated with the fourth set of satellite signals is greater than the cost metric associated with the third set of signals:
- transmit the third set of satellite signals to the PVT processor.

* * * * *